United States Patent
Pineau

(10) Patent No.: US 11,308,538 B1
(45) Date of Patent: Apr. 19, 2022

(54) COMPUTER-READABLE MEDIUM AND COMPUTER SYSTEM FOR EXTRACTING COSMETIC SERVICE INFORMATION AND FOR LOCATING AND INTERACTING WITH COSMETIC SERVICE PROVIDERS

(71) Applicant: Frédérique Pineau, St-Hubert (CA)

(72) Inventor: Frédérique Pineau, St-Hubert (CA)

( * ) Notice: Subject to any disclaimer, the term of this patent is extended or adjusted under 35 U.S.C. 154(b) by 328 days.

(21) Appl. No.: 16/660,489

(22) Filed: Oct. 22, 2019

Related U.S. Application Data

(60) Provisional application No. 62/749,439, filed on Oct. 23, 2018.

(51) Int. Cl.
| | |
|---|---|
| *G06Q 30/06* | (2012.01) |
| *G06Q 50/00* | (2012.01) |
| *G06F 16/9536* | (2019.01) |
| *G06Q 30/02* | (2012.01) |
| *G06F 16/387* | (2019.01) |

(52) U.S. Cl.
CPC ....... *G06Q 30/0629* (2013.01); *G06F 16/387* (2019.01); *G06F 16/9536* (2019.01); *G06Q 30/0282* (2013.01); *G06Q 30/0643* (2013.01); *G06Q 50/01* (2013.01)

(58) Field of Classification Search
CPC ............... G06Q 40/06; G06Q 30/0629; G06Q 30/0282; G06Q 30/0643; G06Q 50/01; G06F 16/387; G06F 16/9536
USPC ..... 705/26.1, 26.61, 26.64, 26.7, 26.9, 27.2, 705/319
See application file for complete search history.

(56) References Cited

U.S. PATENT DOCUMENTS

| | | | | |
|---|---|---|---|---|
| 2008/0279419 | A1* | 11/2008 | Kluesing | G06K 9/00281 382/100 |
| 2010/0185064 | A1* | 7/2010 | Bandic | A61B 5/415 600/306 |
| 2013/0073336 | A1* | 3/2013 | Heath | G06Q 30/02 705/7.29 |
| 2014/0012574 | A1* | 1/2014 | Pasupalak | G06F 16/248 704/235 |
| 2014/0015967 | A1* | 1/2014 | Moore | H04N 5/23219 348/143 |
| 2016/0162979 | A1* | 6/2016 | Robinson | G06Q 30/0641 705/26.9 |

* cited by examiner

*Primary Examiner* — Igor N Borissov

(57) ABSTRACT

A computer system for finding, evaluating and interacting with cosmetic services includes a user computing device for specifying a search query for a cosmetic service and for determining a current location of the user computing device. The system includes a server to search for all cosmetic service providers within an area, to filter the cosmetic service providers based on reviews and visits from contacts of the user, wherein the visits are determined by an artificial intelligence module that compares photographs posted by the contact on social media to infer that the contact has used one of the cosmetic service providers by correlating the times of the posted photographs with a location history. The user computing device displays the filtered cosmetic service providers and enables the user to communicate with one of the cosmetic service providers or with the contact who has used one of the cosmetic service providers.

20 Claims, 27 Drawing Sheets

270

| PICS | TIME | LOCATION | DETECTED CHANGE |
|---|---|---|---|
| jpg754 | T1 | BAR | None Detected |
| None | T2 | SPA | None Detected |
| jpg755, jpg756, jpg757 | T3 | RESTAURANT | Nails |
| jpg758 | T4 | CLINIC | Lips |
| None | T5 | HAIR SALON | None Detected |
| jpg759 | T6 | CLUB | Hair |

COMPUTER-READABLE MEDIUM AND COMPUTER SYSTEM FOR EXTRACTING COSMETIC SERVICE INFORMATION AND FOR LOCATING AND INTERACTING WITH COSMETIC SERVICE PROVIDERS

TECHNICAL FIELD

The present invention relates generally to a computer-readable medium, computer systems and computer-implemented methods for locating service providers and, in particular, to a software application, computer system and computer-implemented method for finding, evaluating and interacting with cosmetic service providers.

BACKGROUND

Conventional web search engines such as Google enable a user to search for beauty and cosmetic service providers based on location and to view the locations on a map. The user may furthermore be able to read online reviews posted by others. There are many shortcomings with the existing state of technology. For example, there may not be any reviews for a given cosmetic service provider or the reviews that are posted may not be considered by the user to be sufficiently trustworthy. Furthermore, there is no easy way for a user to evaluate the results of particular beauty treatments that friends, celebrities or trusted individuals have undergone or to assess the abilities of a particular cosmetic service provider.

There is therefore a need for an application and system to provide an improved system and method for finding, evaluating and interacting with cosmetic service providers.

SUMMARY

One aspect of the present invention is a software application ("app") for beauty or cosmetic services that is recorded on a computer-readable medium for execution by a computing device. Another aspect of the present invention is a computer system that includes a user computing device and a server that cooperate to enable a user to locate beauty or cosmetic services based on various criteria including, amongst other things, photographs, comments and reviews uploaded to social media sites by contacts of the user. As such, the systems, methods and computer-readable media disclosed herein enable a user to extract cosmetic service information and to locate and interact with cosmetic service providers.

Accordingly, one particular aspect of the invention is a computer system for finding, evaluating and interacting with cosmetic service providers. The computer system includes a user computing device such as a mobile device (e.g. a smart phone or tablet) and a server (e.g. cloud server). The user computing device has a user interface (e.g. touchscreen) for receiving user input specifying a search query for a cosmetic service. The user computing device also has a location-determining subsystem (e.g. GPS in the case of a mobile device) for determining a current location of the user computing device. The server is connected via a data network (e.g. the Internet) to the user computing device. The server has a processor configured to search for all cosmetic service providers offering the cosmetic service within a prescribed geographical area based on the search query and the current location of the user computing device. The user computing device is further configured to filter the cosmetic service providers based on reviews and visits from social media contacts of the user. The visits of each contact are determined by an artificial intelligence module that automatically compares photographs posted by the contact on social media to infer that the contact has used one of the cosmetic services and by correlating the times of the posted photographs with a location history of the contact, and further configured to cause the server to transmit filtered cosmetic service providers to the user computing device. The user computing device is further configured to display, e.g. on a map, the filtered cosmetic services and to present a user interface element to enable the user to communicate with one of the cosmetic service providers or with the contact who has used one of the cosmetic service providers.

Another particular aspect of the invention is a computer-readable medium comprising computer-readable instructions in software code which, when stored in a memory and executed by a processor of a user computing device, cause the user computing device to receive user input specifying a search query for a cosmetic service and determine a current location of the user computing device. The software code furthermore causes the user computing device to search for all cosmetic service providers within a prescribed geographical area based on the search query and the current location. The software code further causes the user computing device to filter the cosmetic service providers based on reviews and visits from contacts of the user. The visits of each contact are determined by an artificial intelligence module that automatically compares photographs posted by the contact on social media to infer that the contact has used one of the cosmetic services and by correlating the times of the posted photographs with a location history of the contact. The software code further causes the user computing device to display, e.g. on a map, the filtered cosmetic services and to present a user interface element to enable the user to communicate with one of the cosmetic service providers or with the contact who has used one of the cosmetic service providers.

The foregoing presents a simplified summary of the invention in order to provide a basic understanding of some aspects of the invention. This summary is not an exhaustive overview of the invention. It is not intended to identify essential, key or critical elements of the invention or to delineate the scope of the invention. Its sole purpose is to present some concepts in a simplified form as a prelude to the more detailed description that is discussed later. Other aspects of the invention are described below in relation to the accompanying drawings.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

The following is a description of a computer system and software application for finding, evaluating and interacting with cosmetic service providers.

Figure 1:
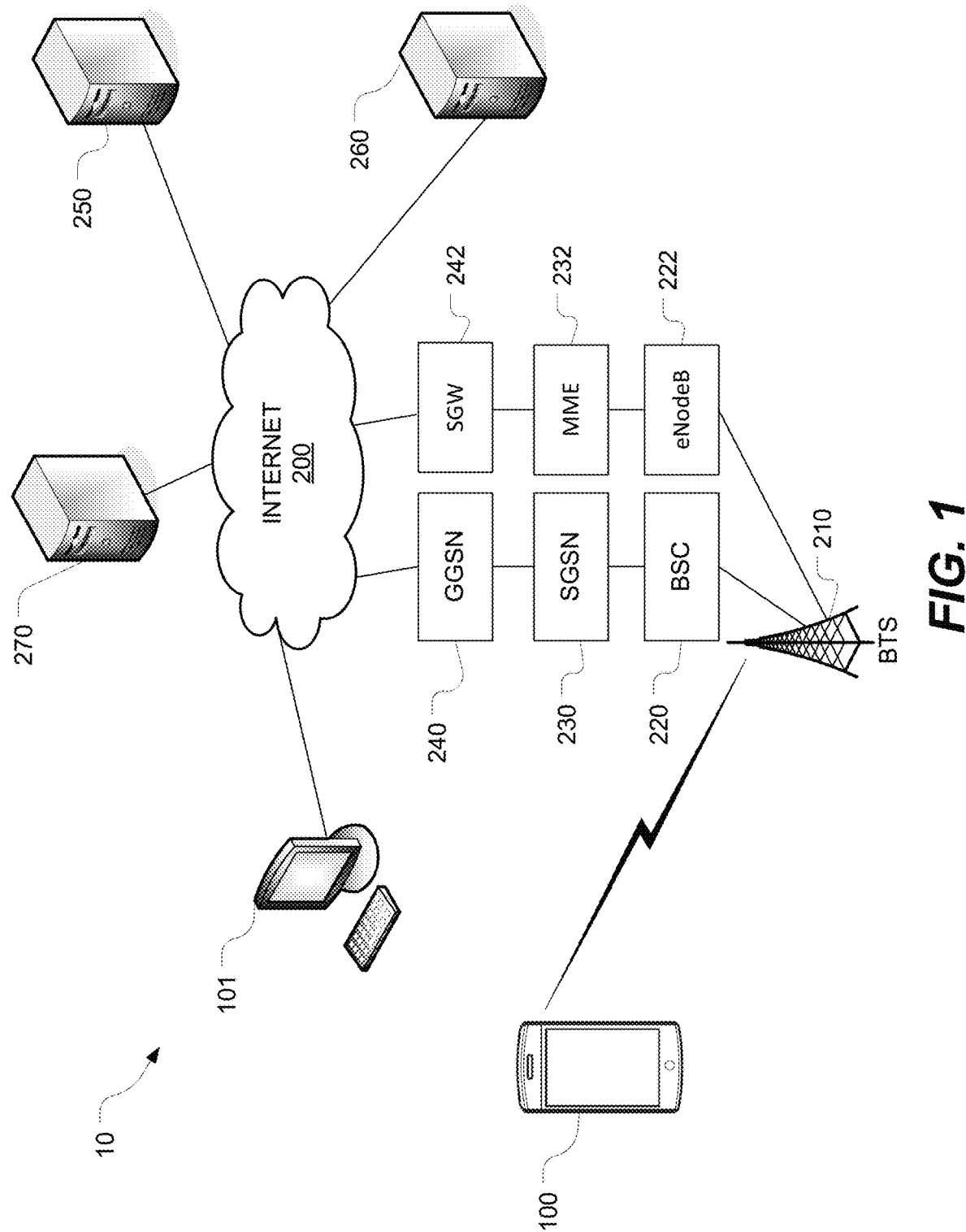
FIG. 1 is a schematic illustration of a computer system for finding, evaluating and interacting with cosmetic service providers in accordance with an embodiment of the invention.

FIG. 1 illustrates a computer system for extracting cosmetic information and also for finding (or locating), evaluating and interacting with cosmetic service providers in accordance with one embodiment of the present invention. The computer system is generally denoted by reference numeral 10. The computer system 10 includes one or more user computing devices 100, 101 that are communicatively connected via a data network such as the Internet 200 to various servers 250, 260, 270. In the embodiment illustrated in FIG. 1, the servers 250, 260 are social media servers such as Facebook® and Instagram®. Other social media servers may be used in other embodiments. In one embodiment of the invention, the server 270 is a cosmetic application server that hosts a cosmetic application, implementing a client-server paradigm to be further elaborated below.

The user computing device 100 may be a mobile device such as a cell phone or smart phone, a tablet, or any other handheld communication device or wireless communications device. Examples of mobile devices include Apple iPhone, Samsung Galaxy, Google Pixel, LG G7, iPad, Microsoft Surface, etc.

The user computing device 101 may alternatively be a desktop computer or laptop. Examples include Dell, HP, Lenovo, Acer, MacBook, etc.

As shown in FIG. 1, where the user computing device 101 is a desktop or laptop connected to the servers 250, 260, 270 via the Internet 200 or other data network, which may involve a virtual private network (VPN). Each of these servers may be a single server, a server cluster, server farm or cloud server. The user computing device 100 has a modem, router or data switch to communicate with the servers 250, 260, 270 over the Internet 200 using standard Transmission Control Protocol/Internet Protocol (TCP/IP) datagrams. The servers 250, 260, 270 may be web servers using Hypertext Transfer Protocol (HTTP). Web applications may be coded using Hypertext Markup Language (HTML), Cascading Style Sheets (CSS) or JavaScript.

Where the user computing device 100 is a mobile device, data may be transmitted using a cellular transceiver to and from the server over a cellular wireless network using cellular communication protocols and standards for packet data transfer such as GSM, CDMA, General Packet Radio Service (GPRS), EDGE, UMTS, LTE, 5G, etc. As shown in FIG. 1, the mobile device 100 communicates over a cellular radiofrequency channel with a cell tower, i.e. a base transceiver station (BTS) 210 which routes the data packets to the Internet via the appropriate gateway depending on the cellular protocol (3G, 4G, 5G).

The data packets sent and received by the mobile device 100 are communicated through a wireless data network, for example either a GERAN/UTRAN network or the LTE-SAE network. A 4G device will communicate via the LTE (Long-Term Evolution-System Architecture Evolution) network whereas a 3G device will access the IP network via GERAN (GSM EDGE Radio Access Network) or UTRAN (Universal Terrestrial Radio Access Network for a UMTS radio access network).

As shown in FIG. 1, GSM data packets received by the base transceiver station 210 are forwarded to a base station controller (BSC) 220, and then to a serving GPRS support node (SGSN) 230, and then to a gateway GPRS support node (GGSN) 240. LTE data packets are handled by eNodeB 222, then the mobile management entity (MME) 232 with its associated Home Subscriber Server (HSS) and then the serving gateway 242. Not shown for simplicity are the packet data network gateway and the Policy and Charging Rules Function (PCRF) Server. Although FIG. 1 shows 3G and 4G networks, it will be appreciated that the invention can be used in a 5G network or in any future wireless network.

Figure 2:
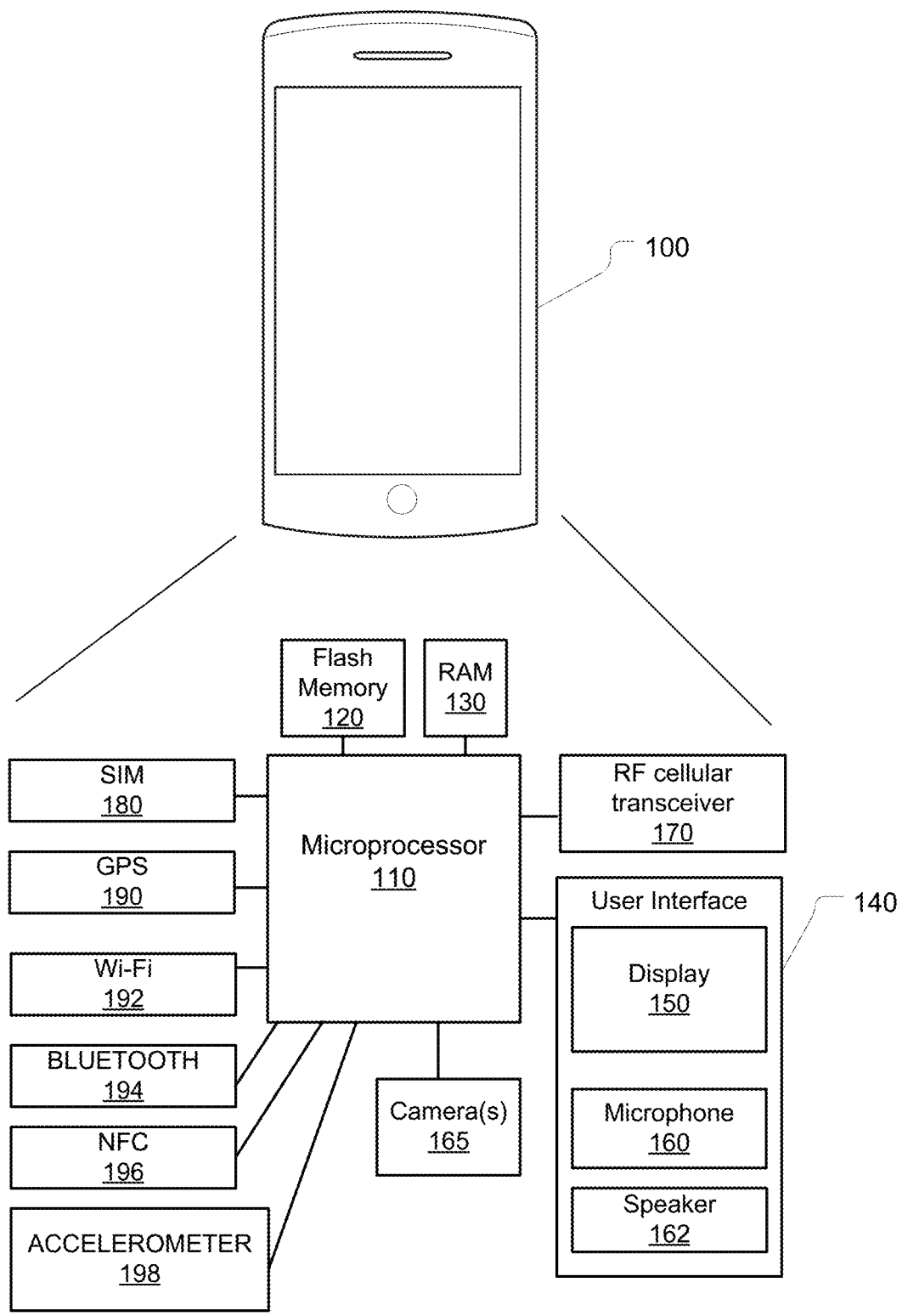
FIG. 2 is a schematic illustration of a wireless communications device or mobile device such as a smart phone that may be used in the computer system of FIG. 1.

FIG. 2 is a schematic illustration of a wireless communications device or mobile device 100 such as a smart phone that may be used in the computer system of FIG. 1.

The mobile device 100 includes a microprocessor (or simply "processor") 110 and memory 120, 130 for executing one or more applications. The memory may include flash memory 120 and/or random access memory (RAM) 130. Other types or forms of memory may be used. The microprocessor 110 is coupled via a data bus to the memory 120, 130 for executing an operating system such as iOS or Android that enables various apps to run on the mobile device such as, but not limited to, a web browser, e-mail, messaging, maps, camera, photos, Facebook, Instagram, and the novel cosmetic application to be described below.

As depicted by way of example in FIG. 2, the mobile device 100 includes a rechargeable battery (not shown) and a user interface 140 for interacting with the mobile device and its applications. The user interface 140 may include one or more input/output devices, such as a display screen 150 (e.g. an LCD or LED/OLED screen or touch-sensitive display screen), and may optionally include a keyboard or keypad. The mobile device 100 optionally includes a microphone 160 for transforming voice input in the form of sound waves into an electrical signal for telephony and speech-recognition or voice commands e.g. Siri® or Alexa®. The mobile device 100 may also include a speaker 162 and/or an earphone jack for audio output.

The mobile device 100 of FIG. 2 also includes forwardly-facing and rearwardly-facing digital cameras 165, using for example complementary metal-oxide semiconductor (CMOS) image sensors.

As depicted by way of example in FIG. 2, the mobile device 100 includes a cellular radiofrequency (RF) transceiver 170. The cellular radiofrequency transceiver 170 enables wireless communication with one or more base stations over a cellular wireless network using cellular communication protocols and standards for both voice calls and packet data transfer such as GSM, CDMA, GPRS, EDGE, UMTS, LTE, etc. The cellular RF transceiver 170 may include separate voice and data channels.

The mobile device 100 may include a Subscriber Identity Module (SIM) card 180 for GSM-type devices or a Re-Usable Identification Module (RUIM) card for CDMA-type devices.

The user computing device 100, 101 also includes a location-determining subsystem for determining a current location of the user computing device. In the case of a mobile device, the location-determining subsystem may be a Global Navigation Satellite System (GNSS) chip such as a Global Positioning System (GPS) chip 190. The GNSS receiver decodes satellite signals transmitted by orbiting GNSS satellites. References herein to "GPS" are meant to include Assisted GPS and Aided GPS. Although the present disclosure refers expressly to the "Global Positioning System", it should be understood that this is being used expansively to include any satellite-based navigation-signal broadcast system, and would therefore include other systems around the world including China's Beidou system, the European Galileo system, the Russian GLONASS system, India's Regional Navigational Satellite System (IRNSS), and Japan's QZSS regional system. The location-determining subsystem of the mobile device may also rely on a Wi-Fi Positioning System (WPS) and/or cellular tower triangulation. In the case of a desktop computer 101, the IP address (either a static or dynamic IP address) may be used to determine an approximate location of the user computing device.

The mobile device 100 of FIG. 2 also has a Wi-Fi transceiver 192 for communicating with a W-Fi router (hotspot) to access the Internet in order to communicate with one or more of the servers 250, 260, 270. The mobile 100 of FIG. 2 also includes a Bluetooth® transceiver 194, a near-field communication (NFC) chip 196, an accelerometer 198, and one or more other data communication ports or sockets for wired connections, e.g. USB, HDMI, Lightning connector, FireWire (IEEE 1394), etc. or ports or sockets for receiving non-volatile memory cards, e.g. SD (Secure Digital) card, miniSD card or microSD card. The mobile device may thus be used by the user to take and upload photos to social media sites, to view friends' posts and to communicate with cosmetic service providers. The mobile device furthermore is able to store and execute a novel service-finding application for not only finding but also evaluating and interacting with cosmetic service providers.

Figure 3:
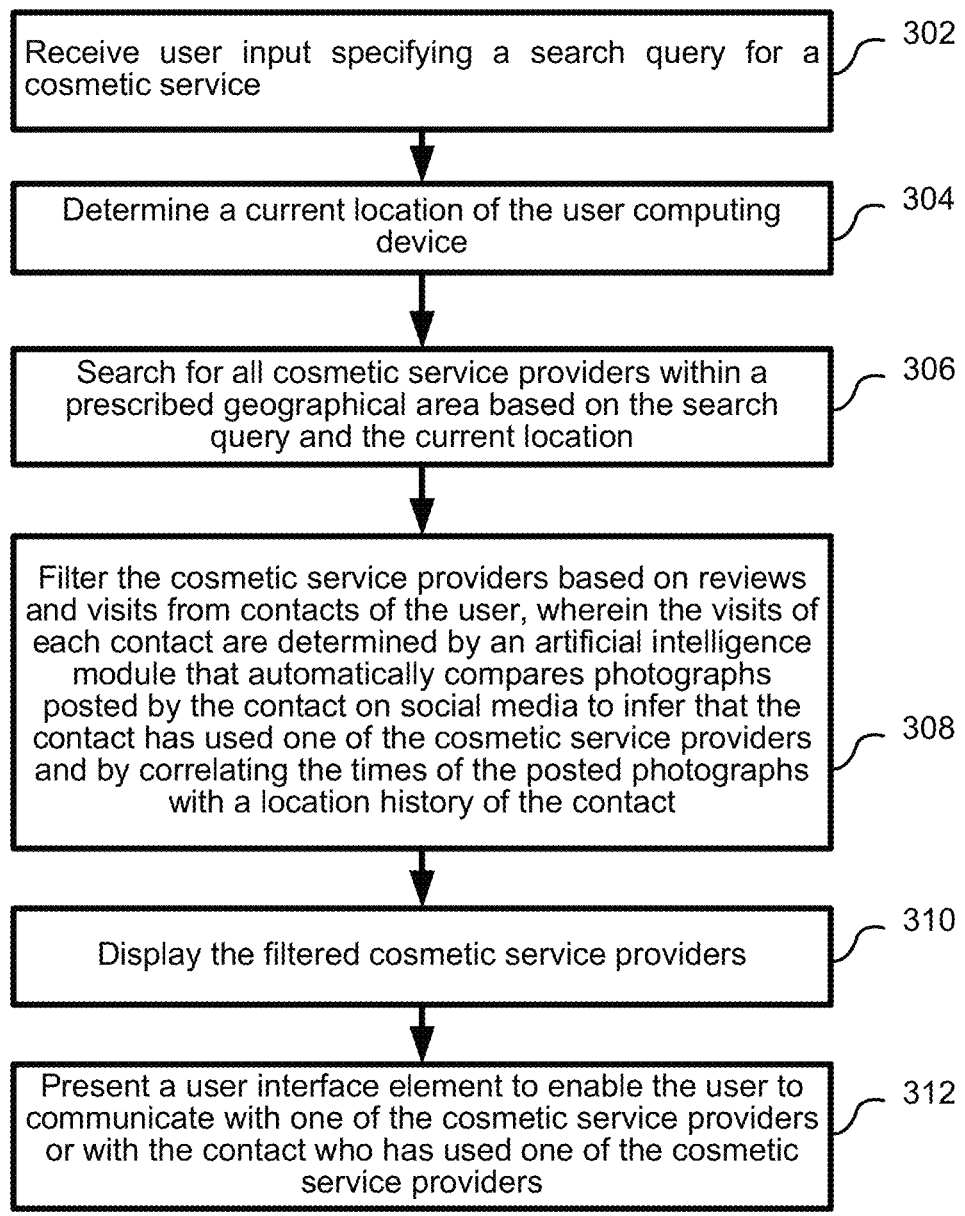
FIG. 3 is a flowchart depicting a method of automatically finding cosmetic service providers.

Operation of one example implementation of the app is now summarized in a flowchart depicted in FIG. 3. In the method presented by way of example in FIG. 3, the user provides user input to the mobile device 100 via the user interface 140 at step 302. The mobile device thus receives the user input specifying a search query for a cosmetic service. The user interface 140 may be a touch-screen display of a mobile device but it could also be a keyboard, keypad, mouse, etc. of a desktop or laptop computer 101. The user interface 140 may also be a voice-recognition module or a gesture-recognition module. The user interface element enables the user to specify the name of the cosmetic service that the user is seeking. The search query may be expressed in plain language or keywords. Some examples of search queries for beauty and cosmetic services are: hair, nails, skin, lashes, brows, lips, face, tan, teeth, collagen, dermal fillers, liftings, implants. Keyword searches may also be done by specifying trademarks or brands of cosmetic services such as Botox®, Juvederm® or CoolSculpting®. As will be described in greater detail below, the user interface 140 also enables the user to access social media platforms like Facebook® and Instagram® hosted by respective servers or server farms 250, 260 to view pics, reviews and other information relating to cosmetic procedures and services.

At step 304, the server 270 determines the current location of the user computing device. This may be done by receiving the location data from the mobile device, which may accompany the search request transmitted from the mobile device to the server 270.

The cosmetic server 270 has a memory and a processor configured to search for all cosmetic service providers offering the cosmetic service within a prescribed geographical area based on the search query and the current location received from the user computing device. This location-based search is conducted by the server at step 306 in FIG. 3. Alternatively, the search may be conducted by the mobile device itself if it has previously downloaded the relevant data.

The prescribed geographical area may be user-defined or based on the locations of one's social media contacts. For example, the user may prescribe that the search is to be limited to the user's home city or to within a certain radius of the user's current location, e.g. 5 km, 10 km, 25 km, 50 km, etc. In addition, the search may be further constrained by time, e.g. the search query may be limited to cosmetic service providers that are presently open or which are open for business on a particular day or time. For example, the user may specify a search for a cosmetic search provider that is open on Saturdays and within 10 km of the user's current location.

The server 270 is further configured to filter the cosmetic service providers based on reviews and visits from social media contacts of the user. This is performed at step 308 in FIG. 3. The server collects data by crawling the social media posts of all contacts of the user who have permitted this crawling activity on their profiles or who have public profiles. The server may crawl social media posts from sources such as Facebook® and Instagram®, or any other social media sites with similar content. In one embodiment of the invention, the visits of each contact are determined by an artificial intelligence (AI) module. Visits to cosmetic service providers may also be determined by check-ins (e.g. on Facebook®) or any equivalent location-determining function provided by another application or by a social media platform.

The AI module may be executed by the server or, in other embodiments, by the user computing device. Using one or more image-comparison algorithms, the AI module automatically compares photographs posted by the user's contacts (friends) on social media to infer that a particular contact has used one of the cosmetic service providers. The AI module correlates the times of the posted photographs with a location history of the contact. The image-comparison algorithm enables the server or user computing device to compare photographs of a particular contact to determine a difference between the two photographs. This difference may be a hair difference (e.g. different colour, length or style of hair), a skin tone difference (e.g. tan), a facial difference (e.g. different lip volume, blemish removal, wrinkle removal, different eyebrow, different eyelashes), a hand difference (e.g. manicure/nails), a body difference (e.g. a surgical procedure such as implants or liposuction). By comparing photographs, the server automatically identifies differences or changes in the appearance of the contact. Comparing two photographs enables the server to infer that the social media contact has used a cosmetic service to change her appearance. Accordingly, the novel server and/or novel app disclosed herein constitute part(s) of a novel computer system that extracts cosmetic service information from photographs, location data and other electronic data sources. This novel computer system also enables novel methods by which the user is able to locate cosmetic service providers and to communicate and interact with the cosmetic service providers.

In various exemplary implementations, comparing two photos is performed programmatically or automatically by the app. In one implementation, comparing the photos entails searching for two photos wherein a first photo is taken before the cosmetic procedure (i.e. a "before photo") and wherein a second photo is taken after the cosmetic procedure (i.e. an "after photo") and furthermore wherein the two photos have substantially the same face size and orientation. For example, the app may search for two photos that are both frontal views of the face. In another example, the app may search for two left side views or two right side views of the face. Comparing thus entails graphically subtracting the before photo from the after photo to obtain an image representative of the facial change due to the cosmetic procedure. Similarly, for cosmetic procedures applied to the body, the app may search for before and after photos of the same part of the body seen from the same angle or orientation.

In another implementation, comparing the photos may entail the following steps, acts or operations: (i) initially verifying that the two photos are of the same person; (ii) verifying if the faces are the same size/scale and, if not, scaling one or both of the photos to make the faces of the two photos the same size; (iii) determining if the faces of each of the two photos are aligned (i.e. the faces are angled in substantially the same orientation; (iv) if the faces are misaligned, generating for one or both faces of the photos, a computer-generated image of a rotated reconstructed image of the face; (v) overlaying the images of the faces by aligning facial landmarks such as eyes, nose and mouth; (vi) subtracting the before face from the after face to determine an image representing the facial change due to the cosmetic procedure. In another implementation, the app or server is configured to generate a 3-dimensional model of the user's head and/or body using a plurality of images. The computer-generated 3-dimensional model can be rotated or scaled to enable matching of a photograph at a desired scale and orientation to a 2-dimensional image extracted from the 3-dimensional model.

Referring still to FIG. 3, the server then automatically attempts to identify the cosmetic service provider that performed the cosmetic service by looking at a location history of the social media contact if such information (i.e. location history) is shared by the contact. If the contact was at a location associated with a cosmetic service provider in the time between the photographs, the server will infer that the contact obtained the cosmetic service at that provider. For example, if the social media contact posted a photograph showing a new hair color and the server determines that the contact was at the location of a hair salon just prior to posting the photograph showing the new hair color, the server will infer that the contact got her hair colored at the hair salon.

Optionally, when comparing photographs, the server identifies and ignores photographs to which filters or lenses have been applied.

Optionally, the server or app may be configured to ignore user locations corresponding to a place of work where the user works. For example, if the user works at a hair salon, spa, estheticians' office, etc, the app may be configured to not use the presence of the user at her own workplace to make inferences about cosmetic procedures.

Figure 4:
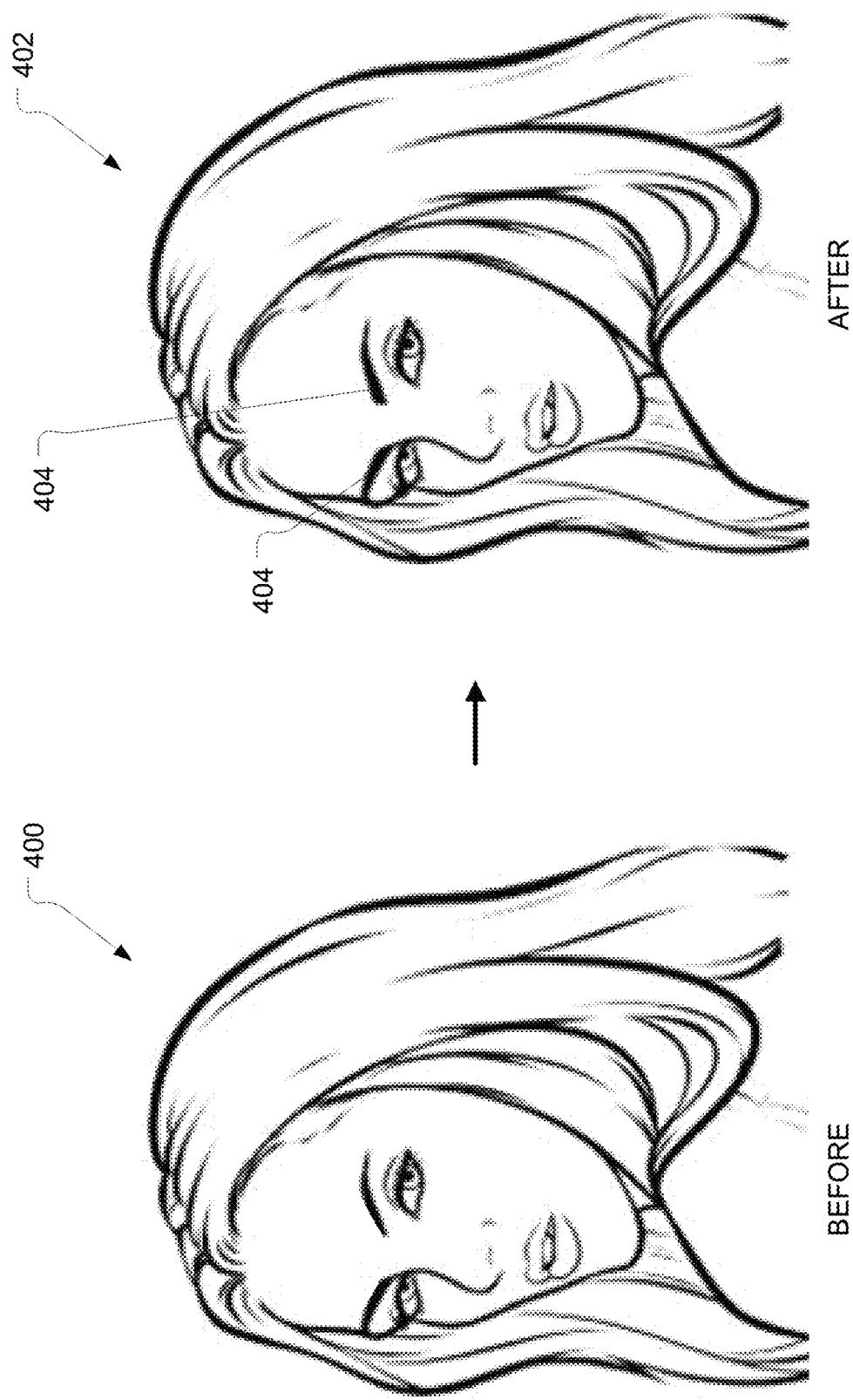
FIG. 4 depicts before and after photographs of a woman who has had a cosmetic procedure to her eyebrows as one example.

FIG. 4 depicts before and after photographs of a woman who has had a cosmetic procedure to her eyebrows as one example. The app or server, as the case may be, compares the before photograph 400 with the after photograph 401 and detects that the woman has had her eyebrows 404 enhanced. The image comparison may be done using any suitable image-comparison or face-recognition algorithm. In one example, the image comparison may be done by an AI or machine-learning algorithm or deep-learning algorithm such as a convolutional neural network (CNN). The app then attempts to identify the cosmetic service provider that performed the procedure by correlating the times and locations of the before and after photographs 400, 402 with a location history of the woman who posted the photographs. In one embodiment, the times of the photos are obtained from the metadata (timestamps) of the photos. In another embodiment, the times when the photos are uploaded to a social media site can be used if the metadata (timestamps) are unavailable or inaccessible.

In one embodiment, the application or server, as the case may be, obtains location information from a location-determining module of the mobile device (e.g. a GPS module having a GPS receiver chipset) and stores the location information in a memory of the mobile device. The location information may, in one implementation, comprise location data sampled at predetermined time intervals. The application may filter the location data by storing as the location history only the locations in which the mobile device has remained for more than a predetermined time, e.g. more than 5 minutes, 10 minutes, 20 minutes, 30 minutes, 1 hour, 2 hours, or any suitable timeframe. In one implementation, the app determines if the sampled location data remains within a predetermined distance (e.g. a radius of 10 meters, 20 meters, etc) for a minimum time, e.g. for a minimum of 10 minutes, 20 minutes, etc.) from which the app can be configured to infer that the user has stopped at a particular location.

The app comprises computer-readable code that performs a reverse location lookup i.e. uses location coordinates of the particular location to search a location database for each of the particular locations where the user has stopped to identify cosmetic service providers corresponding to the particular locations where the user has stopped. The times (obtained from the location history) when the cosmetic service providers were visited are then compared to the times of the photos (e.g. from the photo metadata). Thus, the app comprises computer-readable code that infers that the photos may relate to the visit to the cosmetic service provider. In one implementation, the app comprises computer-readable code that applies a time-based filter before associating a photo with a cosmetic service provider by determining if the time differential between the photo timestamp and the visit to the cosmetic service provider is less than a time threshold, e.g. less than 30 minutes, 1 hour, 2 hours, 1 day, etc. In another implementation, the app comprises computer-readable code that compares the time spent at the cosmetic service provider with a predetermined estimated time for the type of procedure. If the app determines from the photo comparison that the procedure was Procedure A, then the app looks up the predetermined estimated time for Procedure A and then compares the actual amount of time spent by the user at the cosmetic service provider with the predetermined estimated time for Procedure A. If the times match within a prescribed time tolerance, the app declares that the user likely underwent the procedure.

In another implementation, the app comprises computer-readable code that obtains secondary evidence from other data sources such as the calendar application, e-mail, SMS or text messaging, Snapchat, TikTok, or other apps on the mobile device that indicate or imply that the user is planning to undergo or has undergone a cosmetic procedure. For example, the mobile device may compare calendar data to determine if there is a calendar appointment corresponding to the time when the user is detected to be visiting the cosmetic service provider. If the app executing on the mobile device detects an appointment that correlates with the time of the visit, the app may use this secondary evidence to corroborate the inference. The app may be configured to parse the words of a user's texts, e-mails, posts, etc. to identify secondary evidence that the user has planned, or has undergone, a cosmetic procedure. For example, a user may text a friend to say that she is unavailable to meet for lunch because she is going to a salon to get her hair done. This information may be used by the app as secondary evidence to corroborate an inference drawn by the app. The user may control access to the secondary data sources of other applications on the mobile device by configuring the user settings.

In another implementation, the app comprises computer-readable code that is programmed to enable the app to infer a visit to a cosmetic service provider by monitoring destinations entered into a navigation application, a map application or a ride-sharing app such as Uber, Lyft, etc. The app may also monitor a taxi app, a public transit app, etc. for destination information from which an inference may be drawn that the user is traveling, or has travelled, to a cosmetic service provider. In one implementation, the app monitors not just destination information but also departure location information. For example, a user may walk or get a ride from a friend to a cosmetic service provider and then, after the procedure, call an Uber, Lyft or taxi to get home. The departure location (corresponding to the address of the cosmetic service provider) enables the app to determine that the user was present at the cosmetic service provider. The departure location may be entered manually or verbally by the user or it may be determined automatically by the mobile device using a location-determining subsystem like a GPS receiver that is able to determine the current location of the mobile device.

In another implementation, the app comprises computer-readable code that is programmed to enable the app to access and use electronic payments to determine whether the user has undergone a cosmetic service. In this implementation, the app may be programmed to obtain data relating to an electronic confirmation or record of an electronic payment to a cosmetic service provider. The electronic payment record may be obtained from any data source accessible by the mobile device such as Interac, e-transfer, PayPal, Apple Pay, Google Pay, e-Wallet, or invoices received by e-mail. The app parses the data to determine the type of cosmetic procedure and the time when the cosmetic procedure was performed. The user may control access to the electronic payment records of other applications on the mobile device by configuring the user settings.

The various implementations described above may be combined or used in suitable subcombinations.

Figure 5:
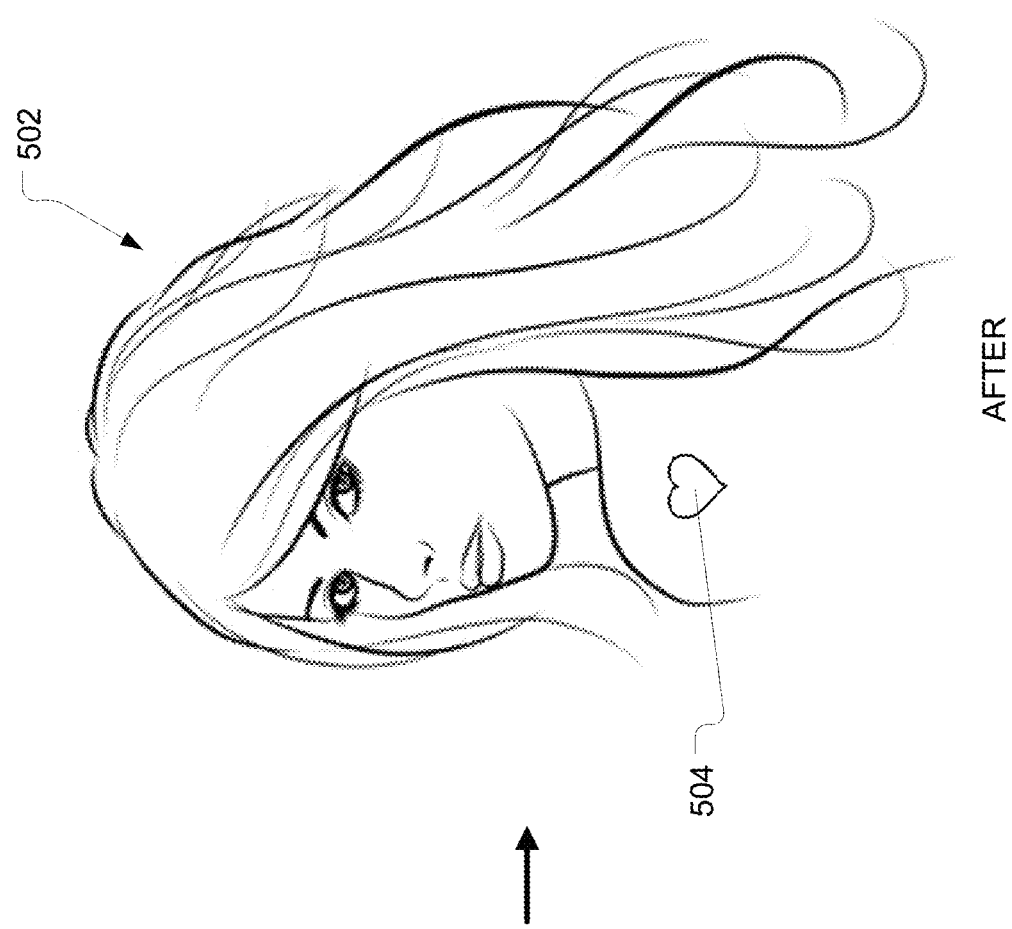
FIG. 5 depicts before and after photographs of a woman who has had a tattoo applied to her back as another example of a cosmetic procedure.
Figure 5:

FIG. 5 depicts before and after photographs 500, 502 of a woman who has had a tattoo 504 applied to her back as another example of a cosmetic procedure. Again, by correlating the timestamp and location metadata of the photos 500, 502, the app or server can infer where the tattoo was obtained. The app or server can thus present to the user the name of the tattoo parlor where the woman most probably obtained her tattoo. The app or server can also ask the user whether she wishes to share this information or keep it private.

Figure 6:
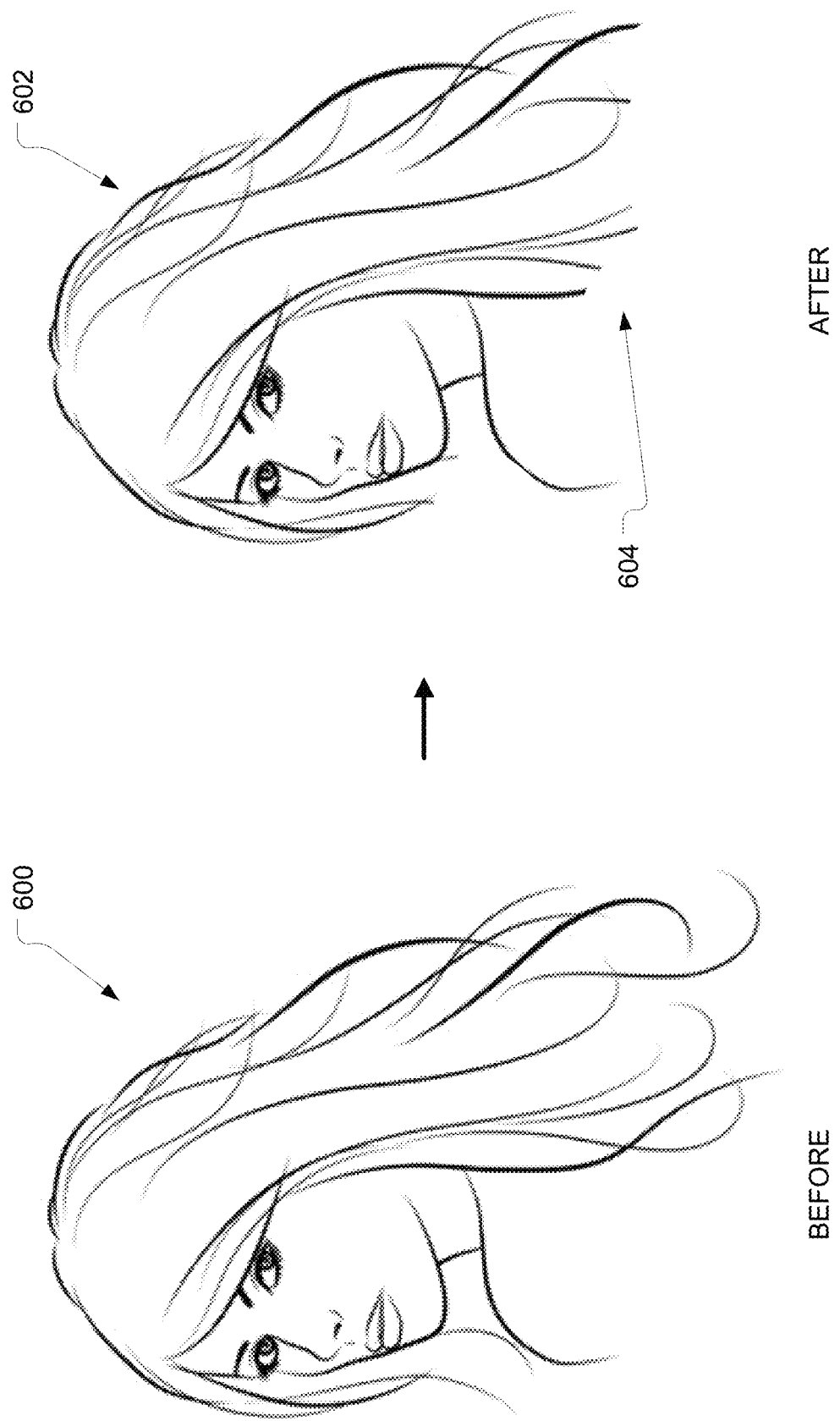
FIG. 6 depicts before and after photographs of a woman who has had her hair done as another example of a cosmetic procedure.

FIG. 6 depicts before and after photographs of a woman 600, 602 who has had her hair 604 done as another example of a cosmetic procedure. By comparing the time and location metadata of the photos, the app can infer which hair salon the woman visited to get her hair done. The app can be configured to enable the woman to tag the salon or post a new pic.

Figure 7:
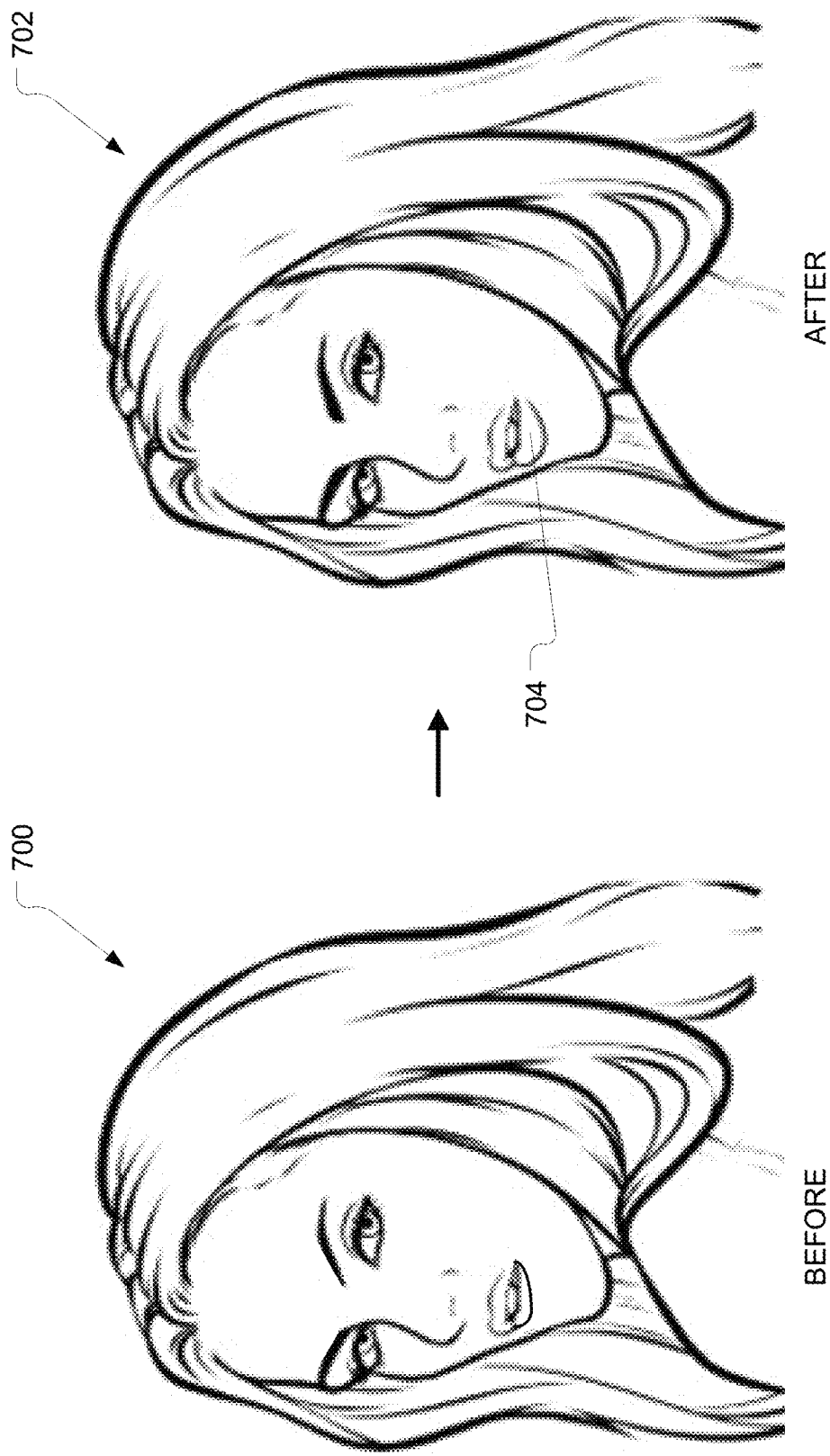
FIG. 7 depicts before and after photographs of a woman who has undergone a cosmetic procedure to her lips as a further example.

FIG. 7 depicts before and after photographs 700, 702 of a woman who has undergone a cosmetic procedure to her lips 704 as a further example. By comparing the time and location metadata of the photos, the app can infer which clinic the woman visited to get her lips done. The app can be configured to enable the woman to keep the information private or to share with a limited group of close friends.

Figure 8:
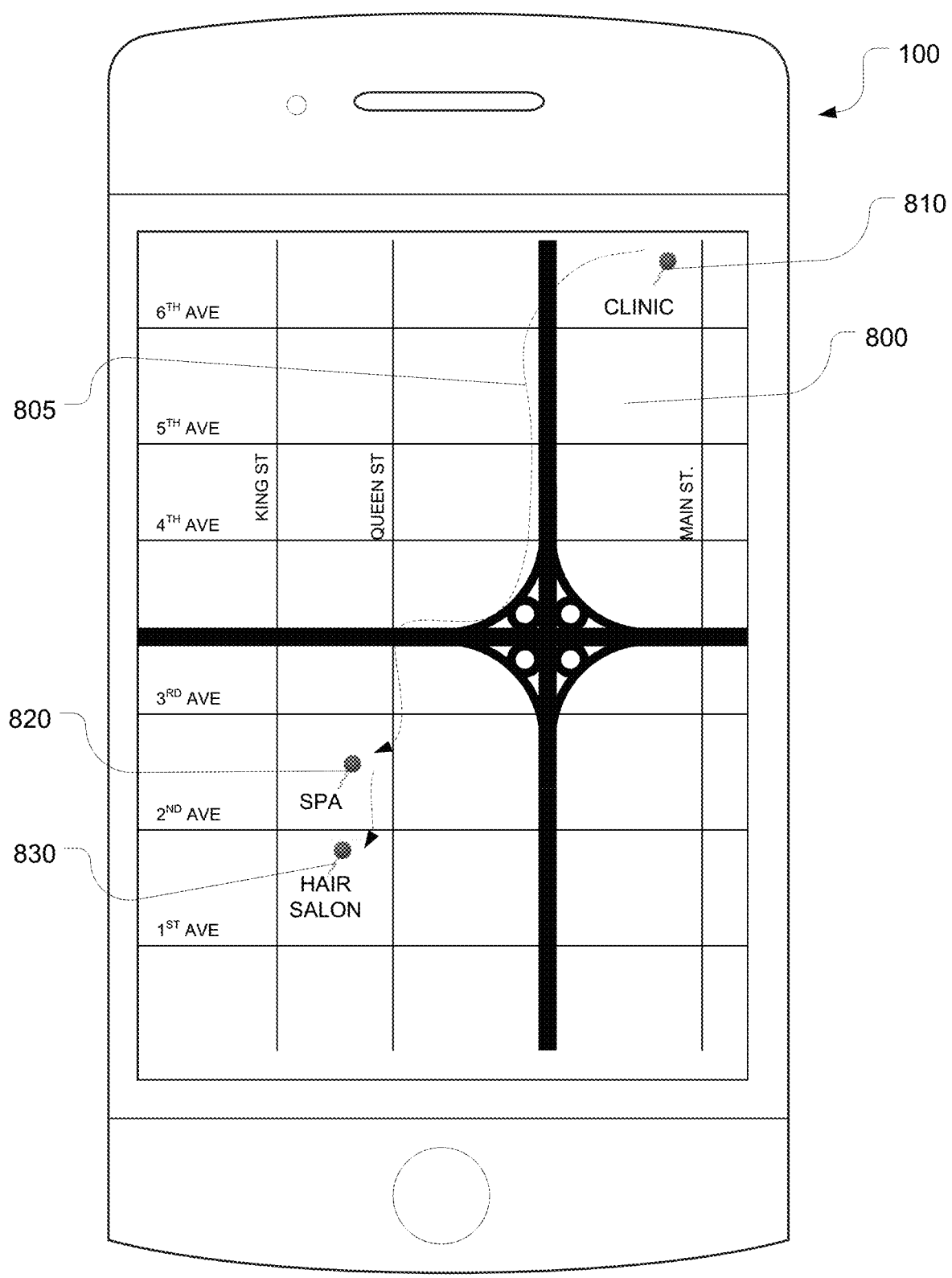
FIG. 8 depicts a graphical user interface of an app for finding, evaluating and interacting with cosmetic service providers.

FIG. 8 depicts a graphical user interface 800 of an app running on the mobile device 100 for finding, evaluating and interacting with cosmetic service providers. The graphical user interface (GUI) may utilize various windows, icons, and menus. In this example, the app tracks the route 805 that the user has taken from a clinic 810, to a spa 820 and then to a hair salon 830. The app stores the route and the names and locations of the cosmetic service providers 810, 820, 830 where the user stopped for a minimum amount of time. This route is then compared with the location and time metadata of photos that the user takes of herself (e.g. selfies) to infer where various visual changes occurred.

Figure 9:
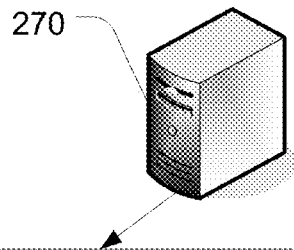
FIG. 9 is a schematic depiction of a database storing and correlating pictures with times and locations to enable a change to be detected and correlated with a cosmetic service provider.

FIG. 9 is a schematic depiction of a database hosted or accessible by the server 270 for storing and correlating pictures with times and locations to enable a cosmetic change to be detected and correlated with a cosmetic service provider. In this simple example, the server 270 maintains a database of pictures (e.g. selfies) and the corresponding times and locations when and where these pictures were taken. This enables the app to compare photos with previous photos to discern changes in the appearance of the user, thereby suggesting that a cosmetic service has been obtained at the intervening location. If the intervening location corresponds to a cosmetic service provider, then this cosmetic service provider is identified to the user or the user's friends as the case may be.

Figure 10:
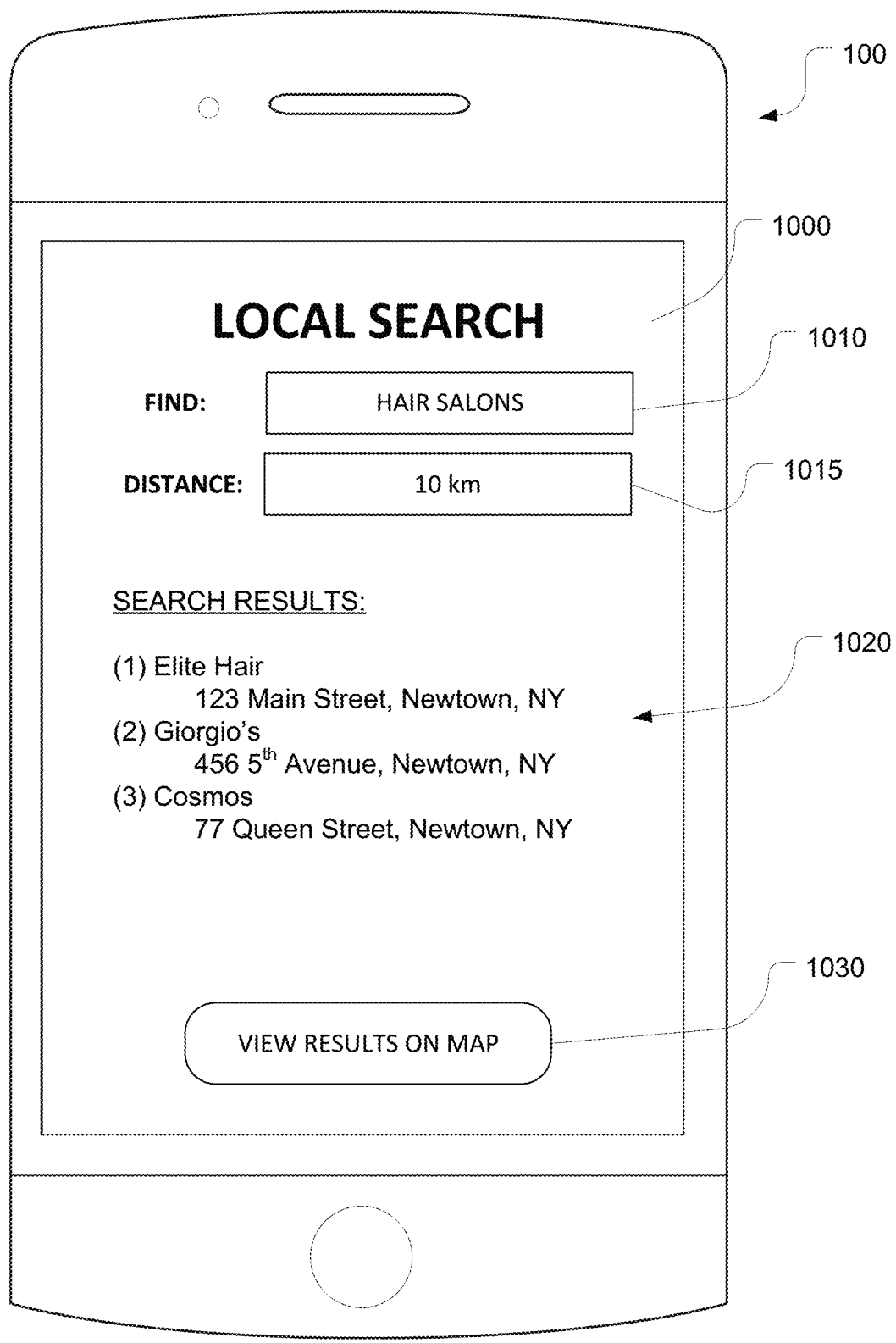
FIG. 10 depicts a graphical user interface for conducting a local search and to review results.

FIG. 10 depicts a graphical user interface 1000 for conducting a local search and to review results. As introduced above, the user can specify a category or keyword and a distance by providing user input to the mobile device 100. The graphical user interface 1000 in this example provides a search field ("find") 1010 and a distance field 1015. The search results 1020 are presented on the graphical user interface. A user interface element (virtual button) 1030 is provided to view results on a map.

Figure 11:
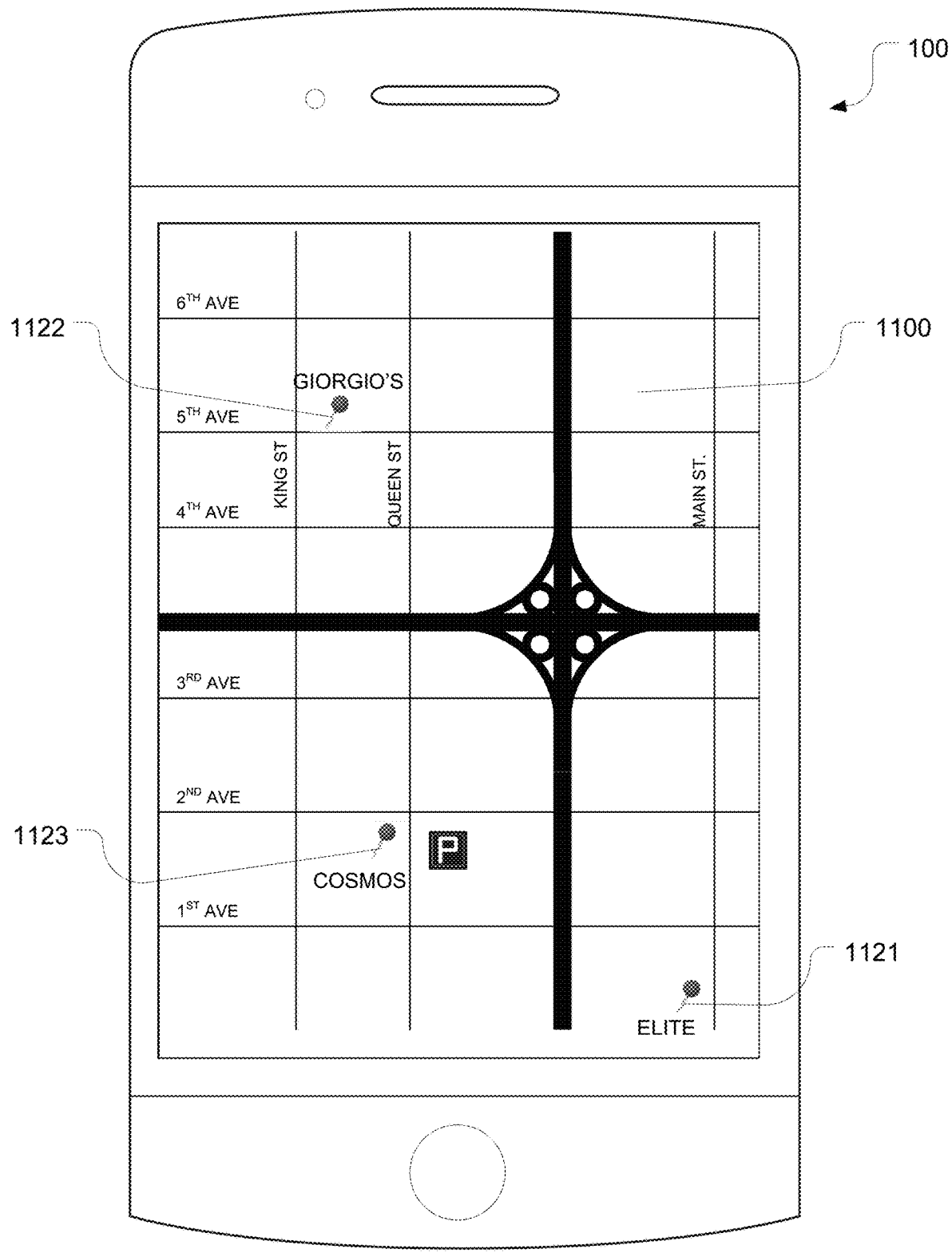
FIG. 11 depicts a graphical user interface showing the search results on a map.

FIG. 11 depicts a graphical user interface 1100 of the mobile device 100 showing the search results on a map. The locations of the three cosmetic service providers 1121, 1122, 1123 may be presented using pinpoint icons or any other suitable graphical representation. In one implementation, the pinpoint icons may be user-selectable to provide additional contact information about the cosmetic service provider that has been selected. Optionally, the pinpoint icons may be user-selectable to cause display of a user interface element to call a ride-sharing service like Uber or Lyft with the destination (address of the cosmetic service provider) already pre-populated by the app. In one embodiment, the cosmetic service provider prepays or offers to pay the cost of the trip using the ride-sharing service from the current location of the user to the cosmetic service provider as an incentive to use the services of the cosmetic service provider. The cosmetic service provider may configure the app operated by the cosmetic service provider to cause the app of the user to display an e-coupon or voucher for a free trip (paid for by the cosmetic service provider) using a ride-sharing service (e.g. Uber or Lyft).

Figure 12:
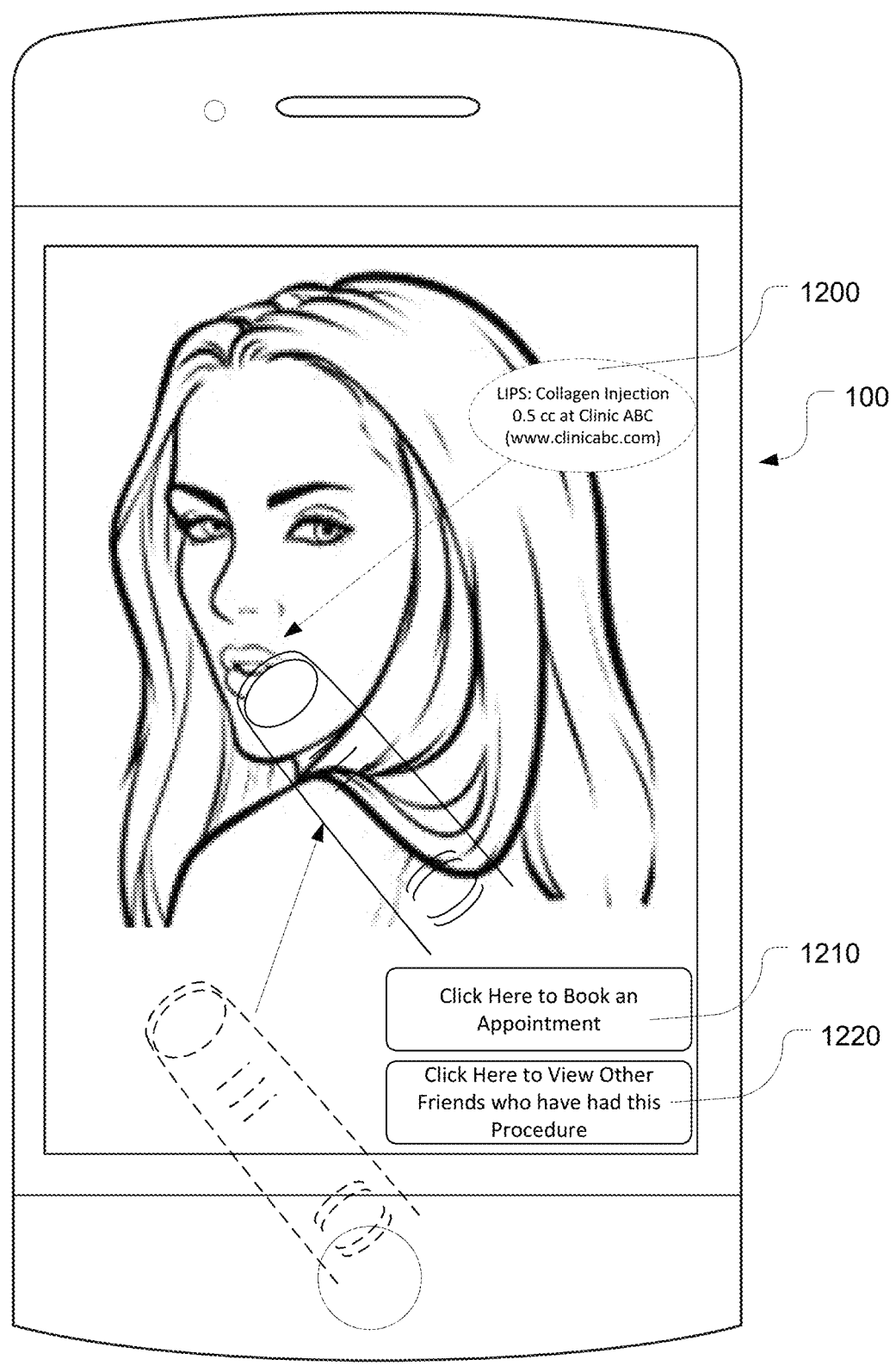
FIG. 12 depicts a mobile device displaying a photograph of the user's friend and further presenting information about the cosmetic procedure that the friend has undergone.

FIG. 12 depicts a mobile device 100 displaying a photograph of the user's friend and further presenting textual information 1200 about the cosmetic procedure that the friend has undergone. Virtual buttons 1210, 1220 enable the user to book an appointment with the cosmetic service provider who has performed the friend's procedure and to view other friends who have had the same procedure. Clicking to book an appointment in one embodiment may automatically generate and send a request to the cosmetic service provider to provide available timeslots. The reply from the cosmetic service provider's own app may also be automated. The acceptance of an appointment time by the user's app and sending of a confirmation back to the cosmetic service provider's app may also be automated. In this embodiment, the appointment may be automatically added to the respective calendars of the user and the cosmetic service provider. In an embodiment, clicking on the virtual button to book an appointment may bring up a calendar to enable the user to select one or more preferred timeslots for the appointment. Thereafter the app sends the request to book an appointment with preferred timeslots for the appointment. In an embodiment, the app operated by the cosmetic service provider replies with confirmation of an appointment and optionally provides a quote, e-coupon, voucher for a riding-sharing service, requests a deposit, and/or sends a medical questionnaire to be completed by the user before the appointment or, alternatively, as a precondition for confirming the appointment.

Figure 13:
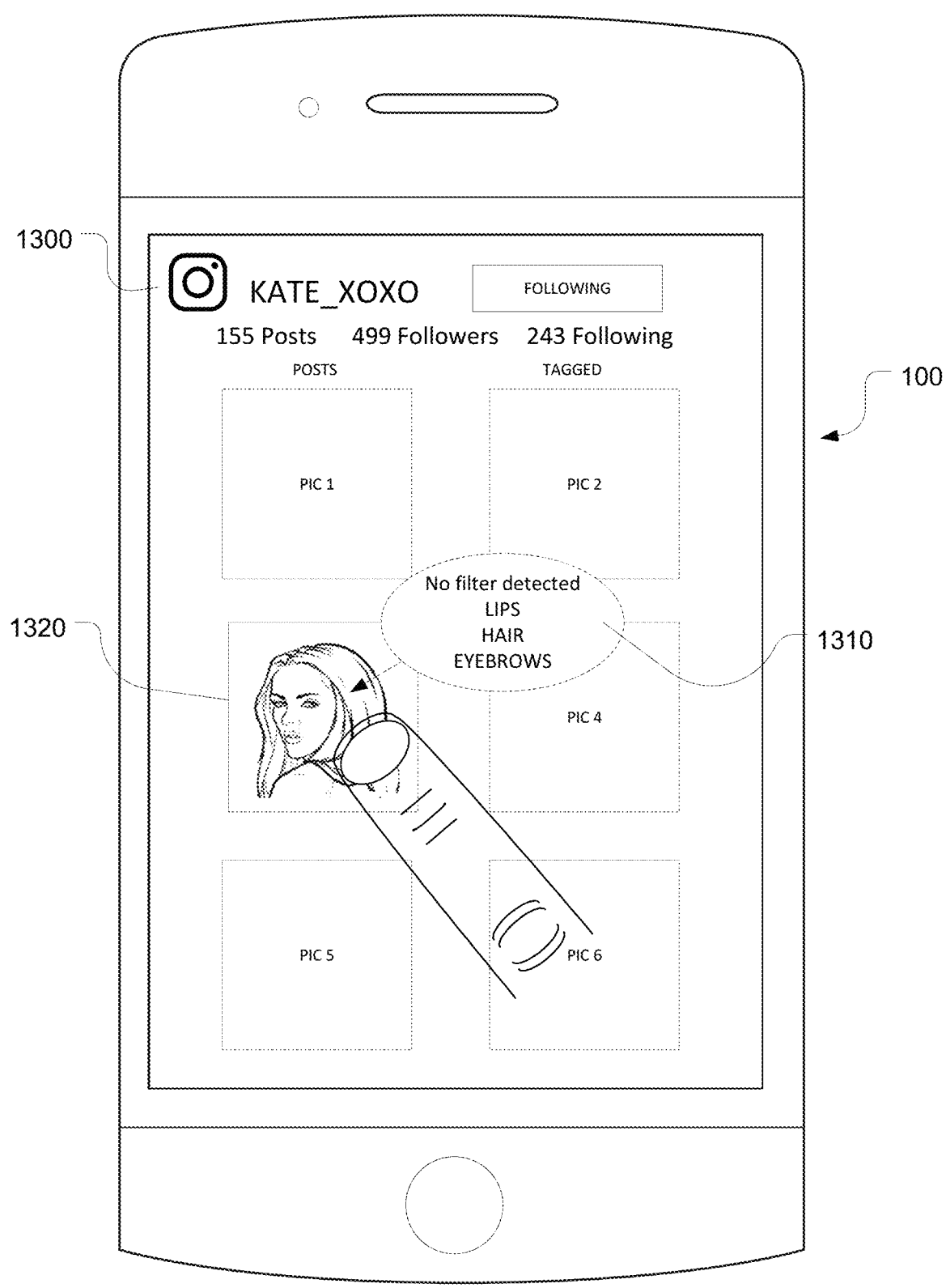
FIG. 13 depicts a social media application on a mobile device that further presents a list of cosmetic procedures undergone by the friend whose picture has been selected by the user.

FIG. 13 depicts a social media application 1300 on a mobile device 100 that further presents a list of cosmetic procedures 1310 undergone by the friend whose picture 1320 has been selected (e.g. touched on a touchscreen device) by the user. In this example embodiment as shown in FIG. 13, the social media application has been configured to cooperate with the cosmetic service application, or the latter can be a plugin, extension or add-on that works in conjunction with the social media application. In the example embodiment of FIG. 13, the social media application is modified to enable a user to select a photo or picture 1320 of a friend to reveal the cosmetic procedures that the friend has undergone, subject to the friend's willingness to share this information with the user. The modified code of the social media application, or of the plugin, extension or add-on, may be programmed to indicate whether any filters were applied to the picture 1320.

Figure 14:
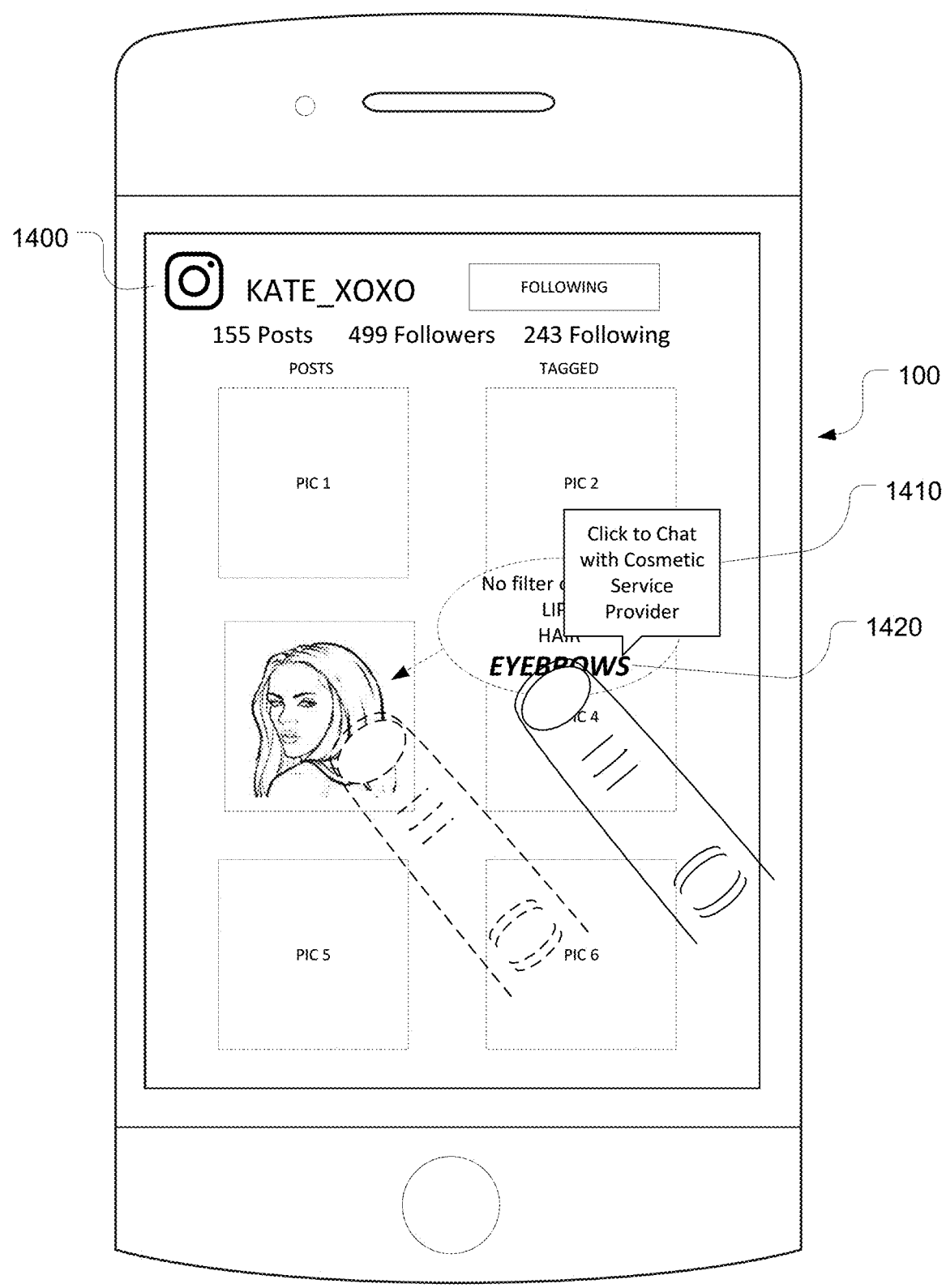
FIG. 14 depicts a further graphical user interface in which the mobile device presents a user interface element to chat with a cosmetic service provider about the cosmetic service selected by the user.

FIG. 14 depicts a further graphical user interface 1400 in which the mobile device 100 presents a user interface element 1410 to chat with a cosmetic service provider about the cosmetic service 1420 selected by the user. In this example, the user has touched "eyebrows". This word is highlighted and/or enlarged and/or the font is changed to emphasize that it has been selected by the user. The cosmetic service provider who performed the eyebrow procedure is identified by the app or server and the user interface element is user-selectable to commence chatting with the cosmetic service provider. In one embodiment, if the cosmetic service provider is unavailable, the app may be programmed to enable the user to send a text or e-mail to the cosmetic service provider. Alternatively, if the cosmetic service provider is unavailable, the app may provide an option to the user to search for the nearest alternate cosmetic service provider offering the same service.

Figure 15:
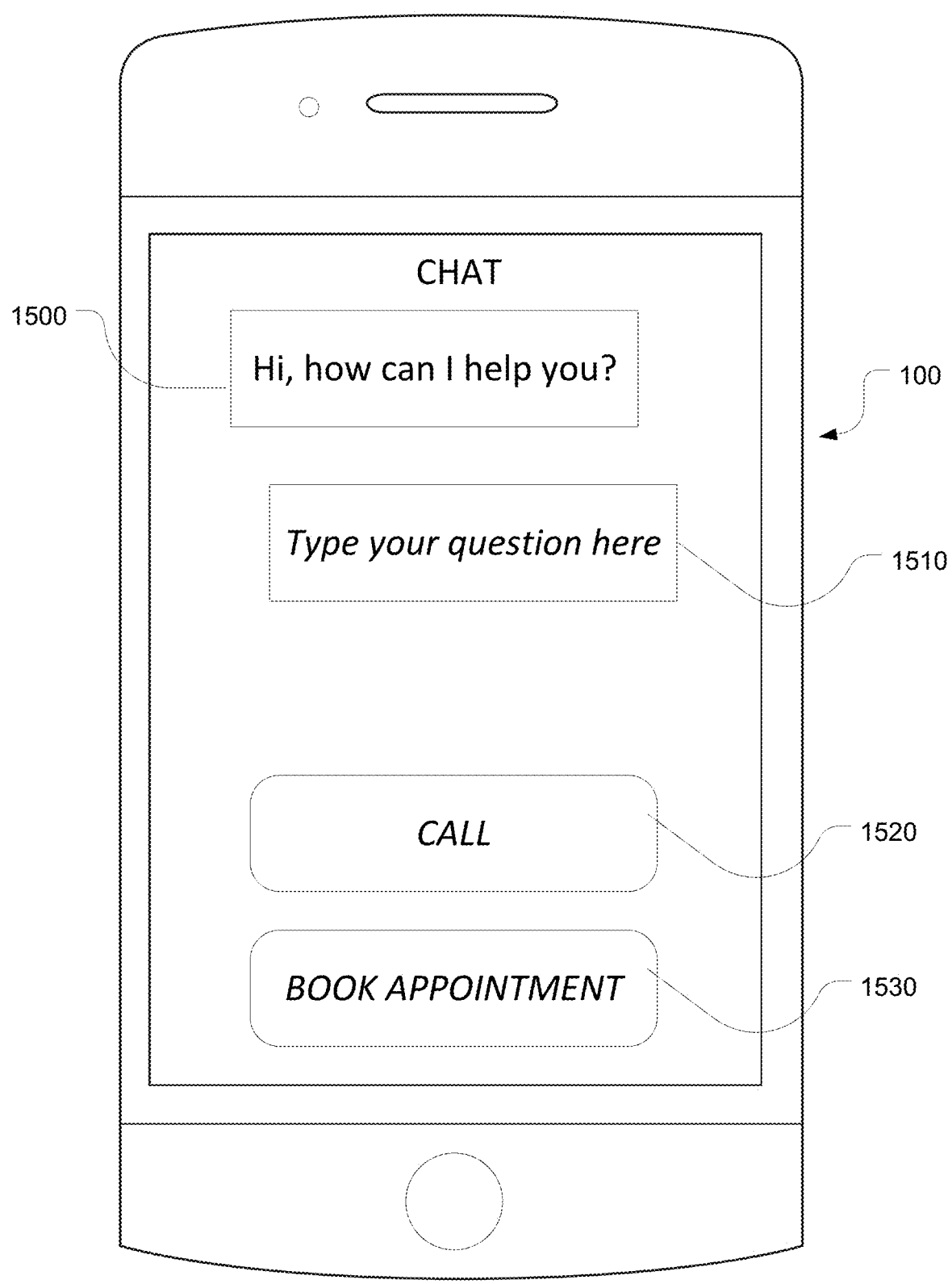
FIG. 15 depicts a further graphical user interface presenting a chat interface for chatting with the cosmetic service provider.

FIG. 15 depicts a further graphical user interface presenting a chat interface for chatting with the cosmetic service provider. The chat interface comprises a first provider message box 1500 and a user message box 1510 as well as separate virtual buttons to call 1520 or book an appointment 1530. Another user interface or layout may of course be provided. In a variant, a chatbot may be used to answer questions from the user.

The server may also parse keywords from textual posts, tweets, SMS messages, e-mails, likes, comments and/or other textual information online to draw this inference. For example, the contact may have liked the salon or posted a review of the salon. This information may also be used by the server to infer where the contact got her hair done. The server may optionally send a message to the contact to ask if she would confirm the inference to enable her friends and followers to know where she got her hair done. Optionally, the server or app may indicate the reliability of the inference. For example, the user may see that the application or server is 80% certain that the cosmetic service was rendered by a particular provider.

Once the inferences are drawn, the server transmits the names and/or contact information of the filtered cosmetic service providers to the user computing device. The server may also transmit with the names and contact information of the filtered cosmetic service providers the names of the friends/contacts who have used the service and links to their photographs, assuming the contacts have authorized this sharing of information with the user. The user computing device 100, 101 receives the results from the server 270. The user computing device 100, 101 is configured to display the filtered cosmetic service providers. Referring back to FIG. 3, this is represented by step 310 of the method. The results may be displayed on a map with pinpoints for each location. The results may also be displayed as a list or in any other suitable format. The pinpoints may be user-selectable icons that present further information about the cosmetic service provider when selected, e.g. touched or clicked, by the user.

The user computing device 100 is also configured to present a user interface element (e.g. a button on the touchscreen of the mobile device) to enable the user to communicate or chat with one of the cosmetic service providers (by calling, videoconferencing, texting, e-mailing, chatting with, or by filling out a web form to request an appointment) at step 312 of FIG. 3. The user computing device 100 may also display a user interface element to enable communication with the specific contact who has been identified as having used one of the cosmetic service providers. Optionally, the user computing device receives links via the chat to social media posts of contacts and/or public profiles containing content relating to the cosmetic service. This feature enables the cosmetic service provider to identify examples of a friend who has had the same proposed procedure or treatment, subject to the friend's consent to share her photo with the user.

In another optional implementation, the user computing device displays a user interface element to automatically book an appointment, add the appointment to a calendar and to prompt the user to post a photograph and/or a review when the user computing device detects that the calendar appointment has ended. Optionally, the user computing device automatically prompts the user to send an electronic payment when the user computing device detects that the calendar appointment has ended.

For privacy, the user computing device may display a user interface element to enable the user to define a subset of contacts on social media with whom cosmetic-related information is shared. Thus, the user can control with whom her beauty-related information is to be shared. Similarly, the user and her contacts may agree to share location history with the server for the purposes of allowing the server to make these inferences. Thus, the user and her contacts remain in control of their location privacy, choosing to share it as they see fit with a trusted group of friends that define a subset of their followers and friends on social media. The user and her contacts may also choose to not share any location data to maintain total privacy. The user and her contacts may allow sharing of only certain cosmetic service information while keeping other information private, e.g. the user may share hair information but not information about body procedures. In one implementation, the app comprises computer-readable code programmed to cause the mobile device to present a privacy settings page that enables the user to specify which friends with whom the location and/or personal cosmetic procedure information is shared. In a variant, the app presents a privacy settings page that includes privacy tiers that enable the user to define tiers or levels of privacy for groups of friends, contacts and followers. Privacy tiers enable the user to apply data filters to the cosmetic information to be shared with her friends, contacts and followers. For example, privacy tiers enable the user to share her most private cosmetic procedure information with her best friends, to share less private information with a wider audience of friends, and all other information she does not regard as private with the rest of her followers. Privacy tiers may be configured based on a category of interpersonal relationship, e.g. family, friends, classmates, coworkers, teammates, etc., based on gender (e.g. females only), based on age, based on geography, based on time (e.g. only information that is recent, or alternatively, only information that is older than a certain time). In a variant, privacy tiers may enable the user to share cosmetic information only with those friends who reciprocally share their own cosmetic information with the user.

Figure 16:
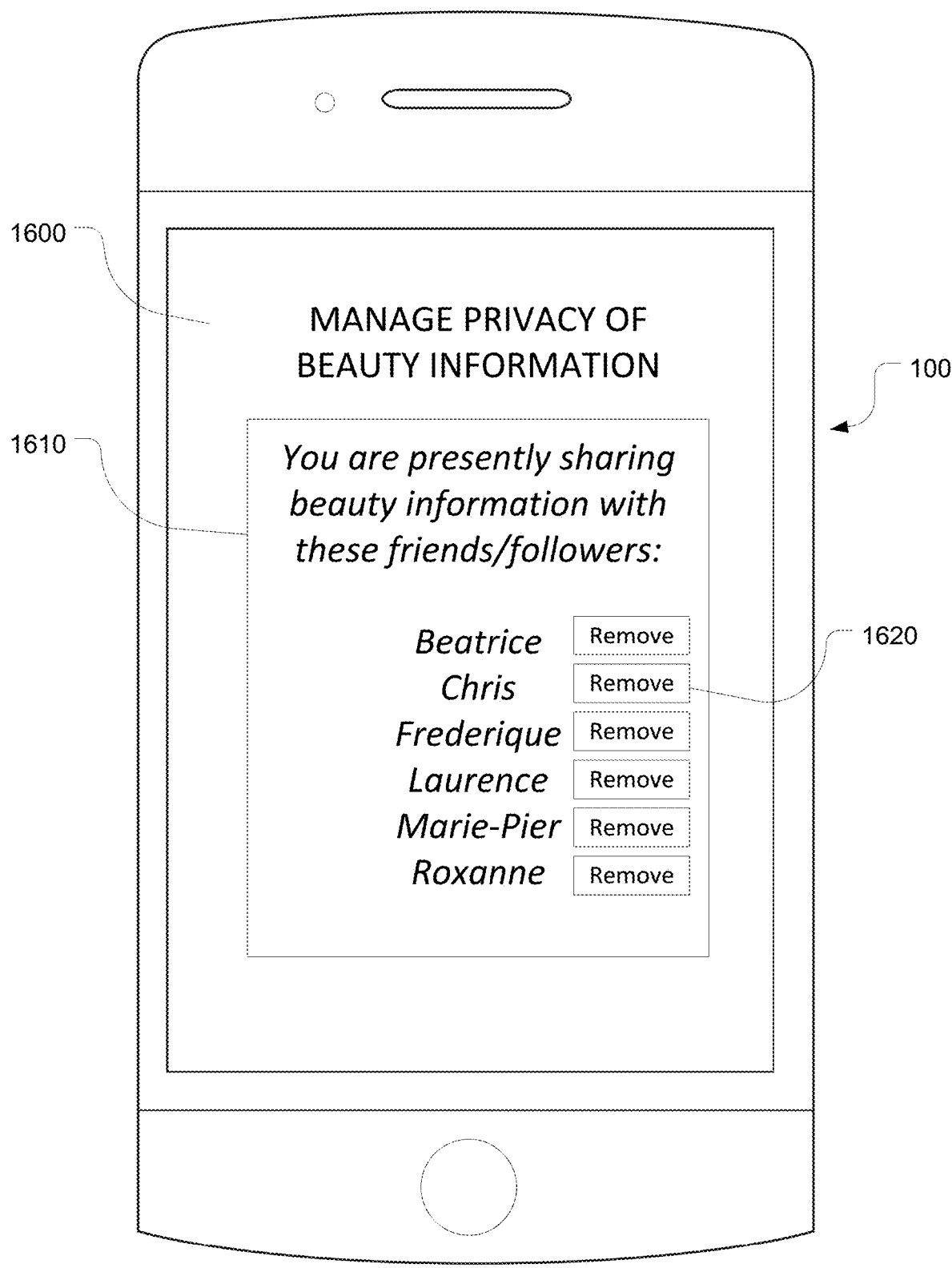
FIG. 16 depicts a mobile device displaying a graphical user interface for managing the friends/followers with whom beauty information is shared.

For example, FIG. 16 depicts a mobile device 100 displaying a graphical user interface 1600 for managing the friends and followers with whom beauty information is shared. A list 1610 of friends and followers is presented as well as user interface elements 1620 to remove these friends and followers to thereby block access to the user's private beauty information so as to keep that information private. Other user interface elements may be provided to add new friends and followers, to grant access to otherwise private beauty information or to specify limits and constraints on what type of information each friend or follower can see.

Figure 17:
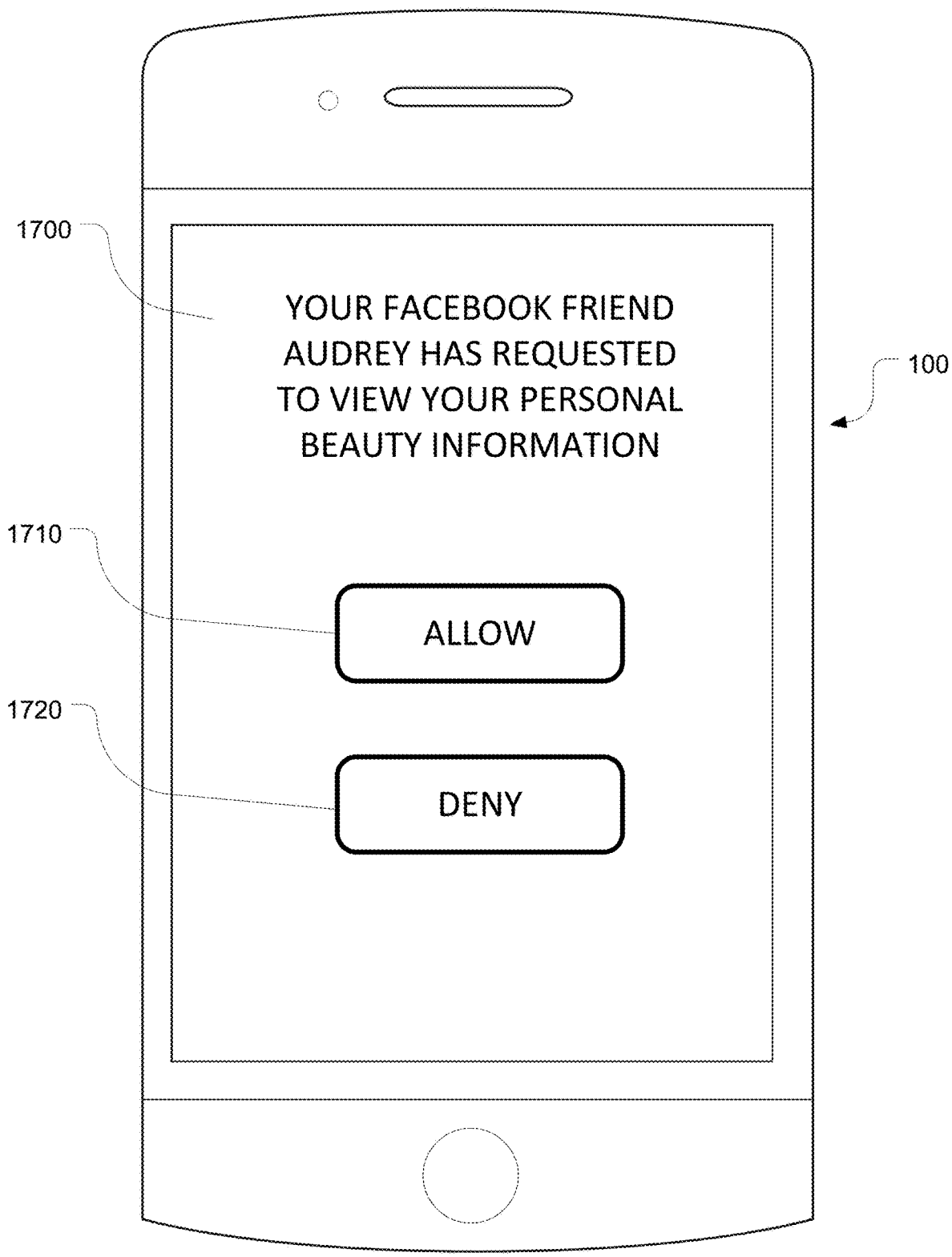
FIG. 17 depicts a mobile device displaying a graphical user interface that presents a request from a friend to view the user's beauty information.

FIG. 17 depicts a mobile device 100 displaying a graphical user interface that presents a request 1700 from a friend to view the user's beauty information. The graphical user interface presents an allow button 1710 and a deny button 1720.

Figure 18:
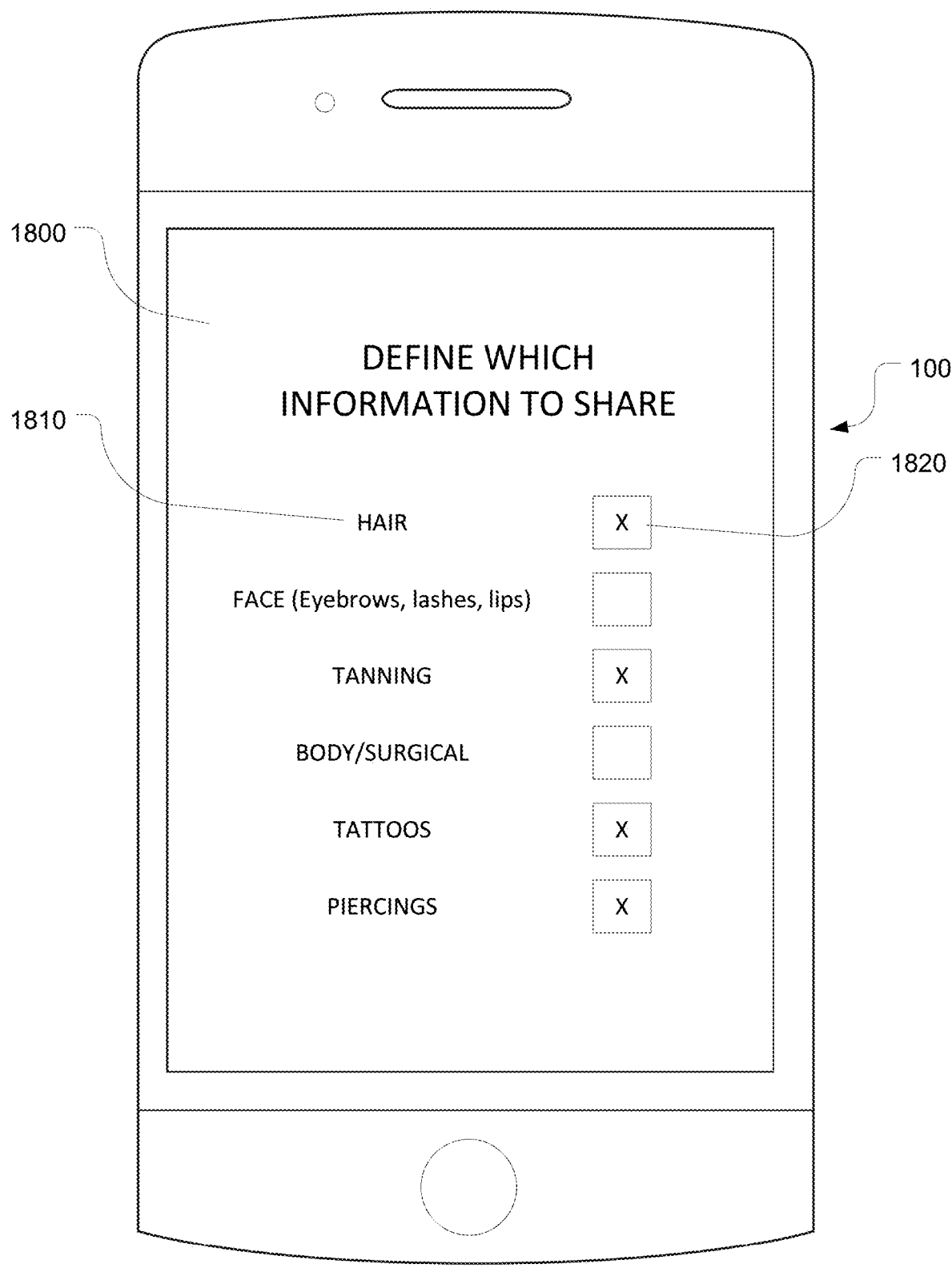
FIG. 18 depicts a mobile device displaying a graphical user interface that presents a screen to enable the user to define which beauty information to share.

FIG. 18 depicts a mobile device 100 displaying another example of a graphical user interface 1800 that presents a screen to enable the user to define which beauty information to share. In this example, the user can define which type of cosmetic procedure/service 1810 to share with her friends/followers by selecting and deselecting a respective check box 1820. As will be appreciated, another user interface or layout may be used to achieve similar functionality.

Figure 19:
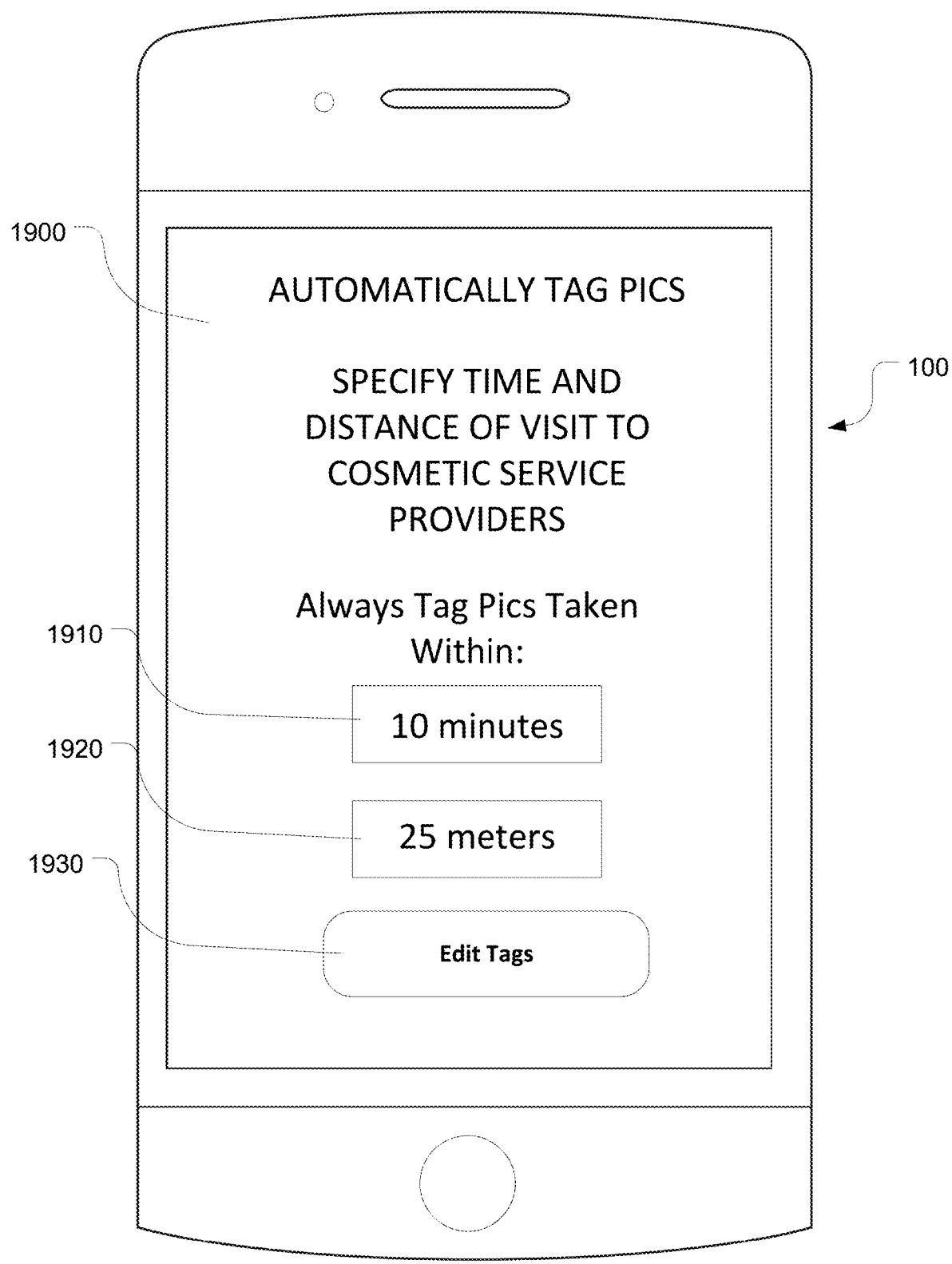
FIG. 19 depicts a mobile device displaying a graphical user interface that presents a screen to enable the user to specify how pictures are automatically tagged based on distance and/or time.

FIG. 19 depicts a mobile device 100 displaying a graphical user interface that presents a screen to enable the user to specify how pictures are automatically tagged based on distance and/or time. In one such implementation of the technology, the user computing device 100 automatically tags a photograph of the user (e.g. selfies) with a keyword identifying the cosmetic service when the photograph is taken within a predetermined time of a calendar appointment at the cosmetic service provider and/or when the photograph is taken within a predetermined distance of the cosmetic service provider. The graphical user interface 1900 of FIG. 19 presents a time field 1910 and a distance field 1920 as well as a virtual button to edit tags 1930. The user can thus enter the time and/or location within which a pic is automatically tagged with a tag identifying the most recently visited cosmetic service provider. For example, the user may specify that any selfie or photo taken within 10 minutes of leaving a cosmetic service provider (clinic, spa, salon, etc.) is automatically tagged with the name of the cosmetic service provider. As another example, the user may specify that any selfie or photo taken within 25 meters of the location of a cosmetic service provider is automatically tagged with the name of the cosmetic service provider. In a variant, the app may prompt the user to tag the pic and may suggest that the pic be tagged with the name of the cosmetic service provider. After taking a pic, the app may query the user to specify whether the beauty information derivable from the pic is sharable or private. The app may also provide a default setting, e.g. share or keep private.

Figure 20:
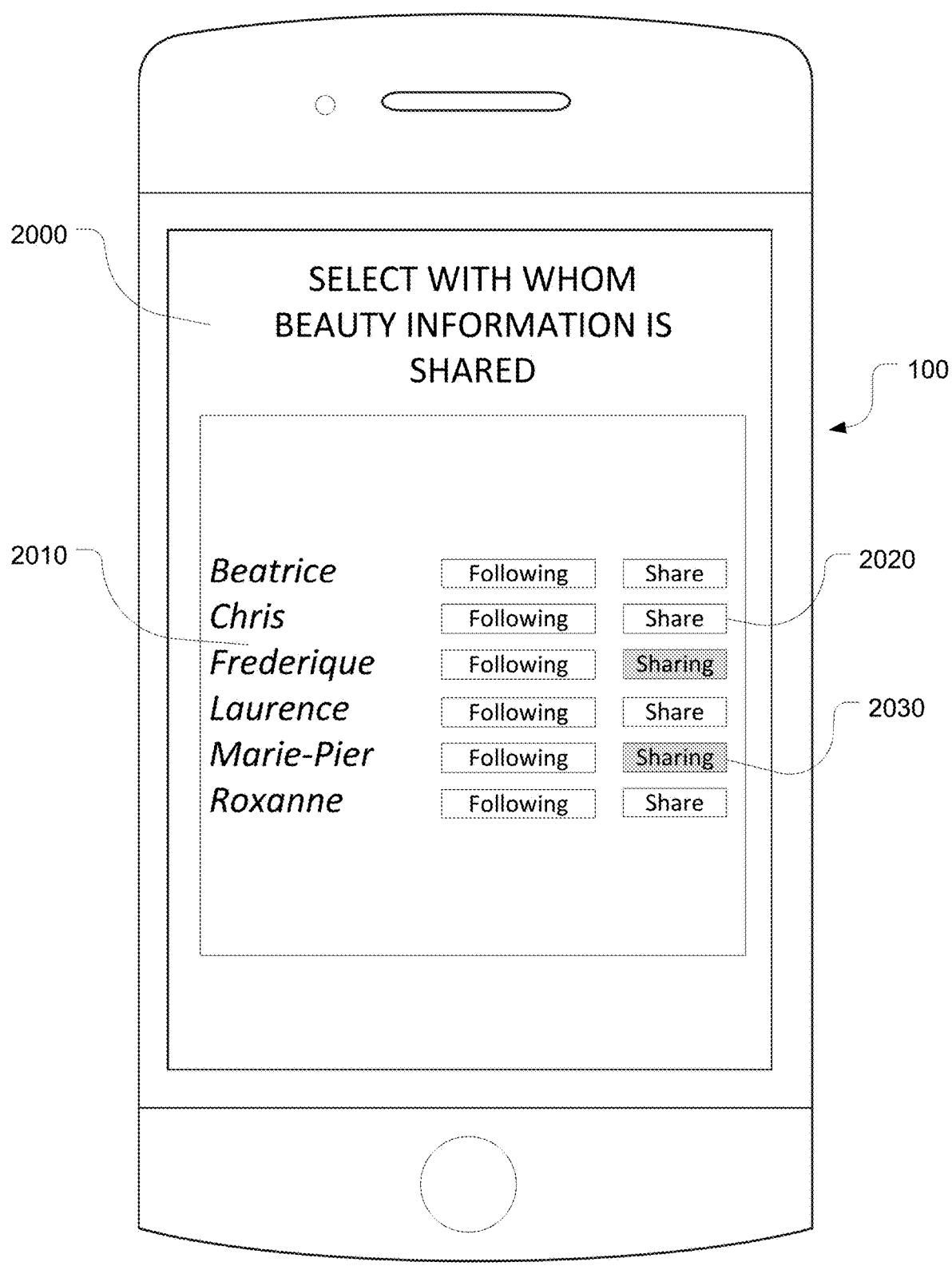
FIG. 20 depicts a mobile device displaying a graphical user interface that displays friends who are following the user via social media and further providing user interface elements to enable the user to selectively share beauty information with one or more of those friends.

FIG. 20 depicts a mobile device 100 displaying a graphical user interface 2000 that displays names of friends/followers 2010 who are friends with or following the user via social media and further providing user interface elements 2020, 2030 to enable the user to selectively share beauty information with one or more of those friends.

The user computing device may be configured to perform the above functionalities by executing a novel software application ("app"). The app is recorded on a non-transitory computer-readable medium comprising computer-readable instructions in software code. The non-transitory computer-readable medium or machine-readable medium is in most instances a computer-readable memory. When stored in a memory and executed by a processor of a user computing device, the app causes the user computing device to receive user input specifying a search query for a cosmetic service, determine a current location of the user computing device, and then search for all cosmetic service providers within a prescribed geographical area based on the search query and the current location. The app then filters the cosmetic service providers based on reviews and visits from contacts of the user. The visits of each contact are determined by an artificial intelligence module that automatically compares photographs posted by the contact on social media to infer that the contact has used one of the cosmetic service providers by correlating the times of the posted photographs with a location history of the contact. The app then displays the filtered cosmetic service providers and presents a user interface element to enable the user to communicate with one of the cosmetic service providers or with the contact who has used one of the cosmetic service providers.

The application provides many benefits and advantages. The application enables searching for beauty services and seeking advice from friends and professionals. The application provides a source of information and a geographic index of hundreds of beauty-related businesses (i.e. cosmetic service providers). The app enables users to find beauty services, to get informed, to book appointments and perform myriad other functions as disclosed herein.

The app enables the user to find the very best places for services nearby. It also provides the user with insight into the businesses through reviews, customer pictures and red flag alerts. Furthermore, the app also distinguishes itself by the way it connects the user to friends and to the professionals, making it easy for the user to establish a relationship with a trustworthy and qualified expert. It is important for a user to get informed before undergoing a cosmetic procedure and it is absolutely normal to have doubts or questions, which is why the app lets the user chat, email or call a professional who will reassure the user, walk the user through the procedure by explaining every detail and eventually help the user book an appointment if the user decides to proceed.

The app provides a community that connects the user with friends, followers, favorite stars, public figures, cosmeticians, beauticians, estheticians, nurses or other healthcare professionals, etc. Each user decides what the user shares. The app provides information about friends' top beauty picks, their beauty secrets and the businesses they love and trust. Each user can then share her beauty secrets with her friends on the app. The interactive app eliminates the hassle of searching for hours for the best beauty salons or for makeup tips and tricks.

The application locates and provides information on all local beauty salons, hair salons, spas, and cosmetic surgery businesses in a given area. Users can begin their searches by selecting either one or more criteria from various categories such as: face areas, body areas, professionals, businesses/stores, best rated professionals or businesses/stores, etc. With the help of rating scores, reviews, pictures and tips coming from other women and celebrities already connected to the user through social media, as well as from professionals, educated, safe and thought-through decisions concerning self-care or beauty procedures are made easy. The user can get informed from the moment they get the idea of improving a face/body area all the way up to the post procedure follow ups with the professional they picked and trust. Users are encouraged to leave a review of the professional/store they attended (ideally with pictures) and share their own experience to enable other users to make enlightened choices with the help of the app. Users might sometimes have other women contact them for specific questions which they may choose to answer or not. Users can also surf through other people's pages and get inspired by celebrities or public figures sharing their beauty secrets or a list of all the people/places they trust for cosmetic and beauty services.

The app can be programmed to enable the user to perform basic or advanced searches with keywords or Boolean logic in various different ways. For example, the app can enable the user to search by: fields of beauty (e.g. lash extensions, nails, etc.); professionals (e.g. technicians, hairstylists, estheticians, cosmeticians, beauticians, nurses, etc.); cosmetic service provider (clinic, salon, etc.). Searches may also be performed based on location, distance, etc. Searches can be performed using a Nearby function with the possibility to pick one or various fields such as current promotions, hotspots (e.g. places where celebrities or public figures have been), newest (professional, places), date and time of desired appointment or other such criteria.

The app may be programmed to propose or suggest beautify packages (e.g. huge packages providing a complete transformation with, for example, five or more services bundled as a package). For the beautify packages, the app may present before and after pictures and links to friends who have purchases a beautify package. The app may also be programmed to enable the user to do event-based searches (e.g. a bundle of services appropriate for a wedding, prom, etc.)

The app comprises computer-readable code that is programmed to enable the user to create, or participate in, a forum based on a topic and/or a personal page to discuss cosmetic services.

The app comprises computer-readable code that is programmed to enable the user to define hashtags, or to use predefined hashtags, that identify the user to her friends and followers on social media platforms as being an active user of the app and/or a person who is willing to share her beauty information with her friends.

The app comprises non-transitory computer-readable code that is programmed, in some embodiments, to dynamically rank the cosmetic service providers based on trustworthiness factors such as feedback, reviews or endorsements from celebrities or public figures, cosmetic service providers with the most reviews and/or the best reviews, those who have received the most likes or who have the most followers, etc. The app can optionally also provide red flags to alert users of places or providers to avoid.

The app comprises, in some embodiments, non-transitory computer-readable code that is programmed to present content from professionals or cosmetic service providers. The professional content may include text, photos, blogs, videos, and/or podcasts (collectively "beauty capsules"), what to pay attention to, makeup artist tips and before/after photos, e.g. to show what the effect of a 1 cc collagen injection looks like in the lip.

In at least some embodiments, the app comprises computer-readable code that is programmed to enable the user to decide whether or not to share her data (places she is interested in, treatments/products bought, reviews). The app allows the user to remain anonymous or to anonymize portions of her data. The app may also be programmed to enable a user to define and share a group of cosmetic service providers (the user's "glam squad") for her friends to see who does her hair, nails, makeup, lips, etc.

Figure 21:
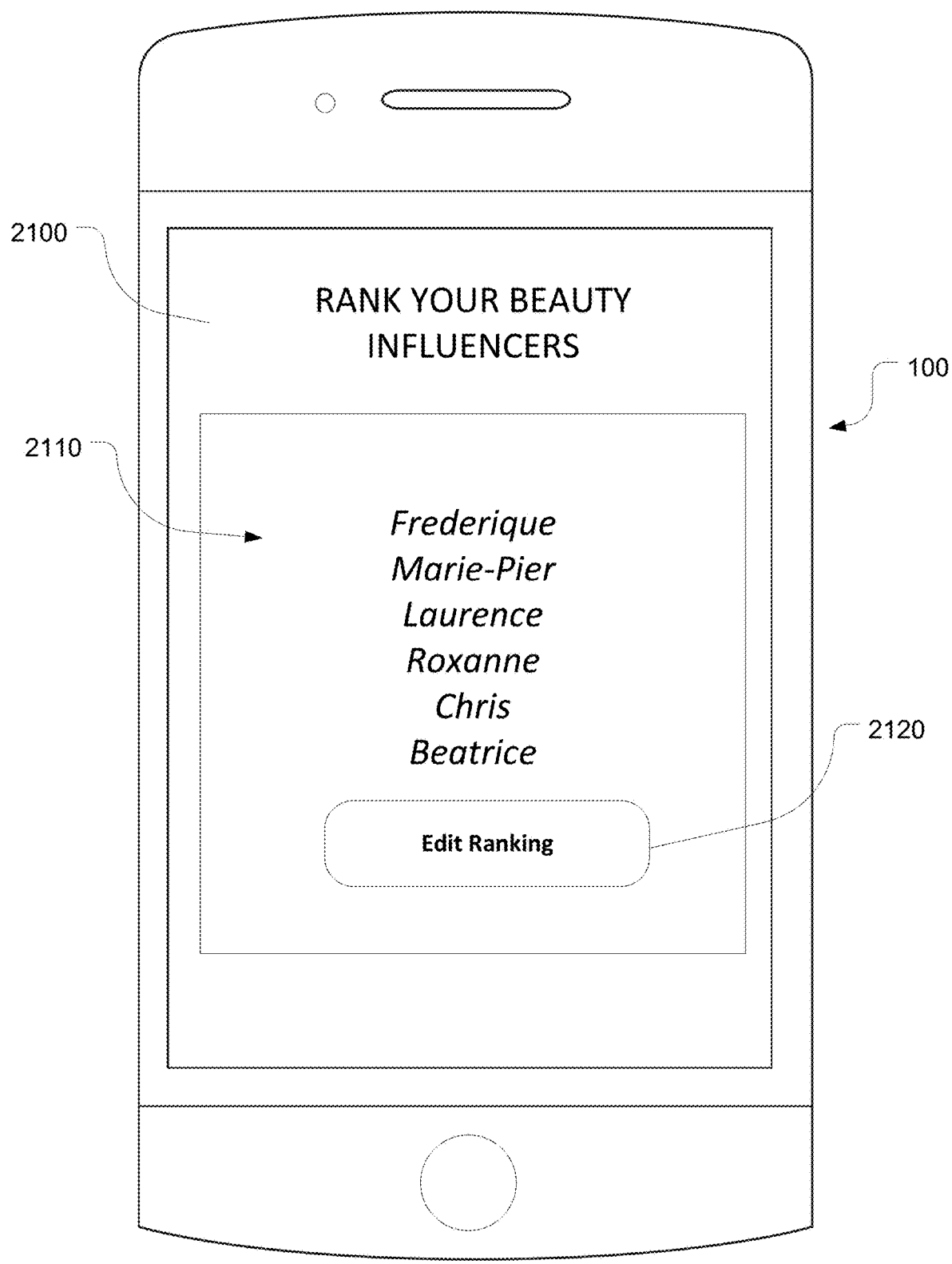
FIG. 21 depicts a mobile device displaying a graphical user interface that enables a user to rank beauty influencers.

FIG. 21 depicts a mobile device 100 displaying a graphical user interface 2100 that enables a user to rank beauty influencers from among her contacts/friends. In this optional implementation of the technology, the user computing device filters the cosmetic service providers based on a ranking of the contacts and presents the ranking 2110. The user interface also provides a virtual button (or user interface element) to edit the ranking 2120. The ranking can be based on a user-assigned ranking of contacts (which friends the user trusts most or prefers), a computer-generated ranking based on a number of followers of the contact or a computer-generated ranking based on a number of likes received by the contact. Alternatively, the ranking of the user's friends may be based on the number of times the user views each of her friends' posts and/or number of times she has visited of her each friends' profiles, or the total time spent on each of her friends' profiles, or the number of messages sent by the user to her friends, the number of likes by the user given to each of her friends, the number of times the user has posted comments on each friend's profile, a combination thereof or other such indicia that implies how much the user admires each friend's appearance.

Figure 22:
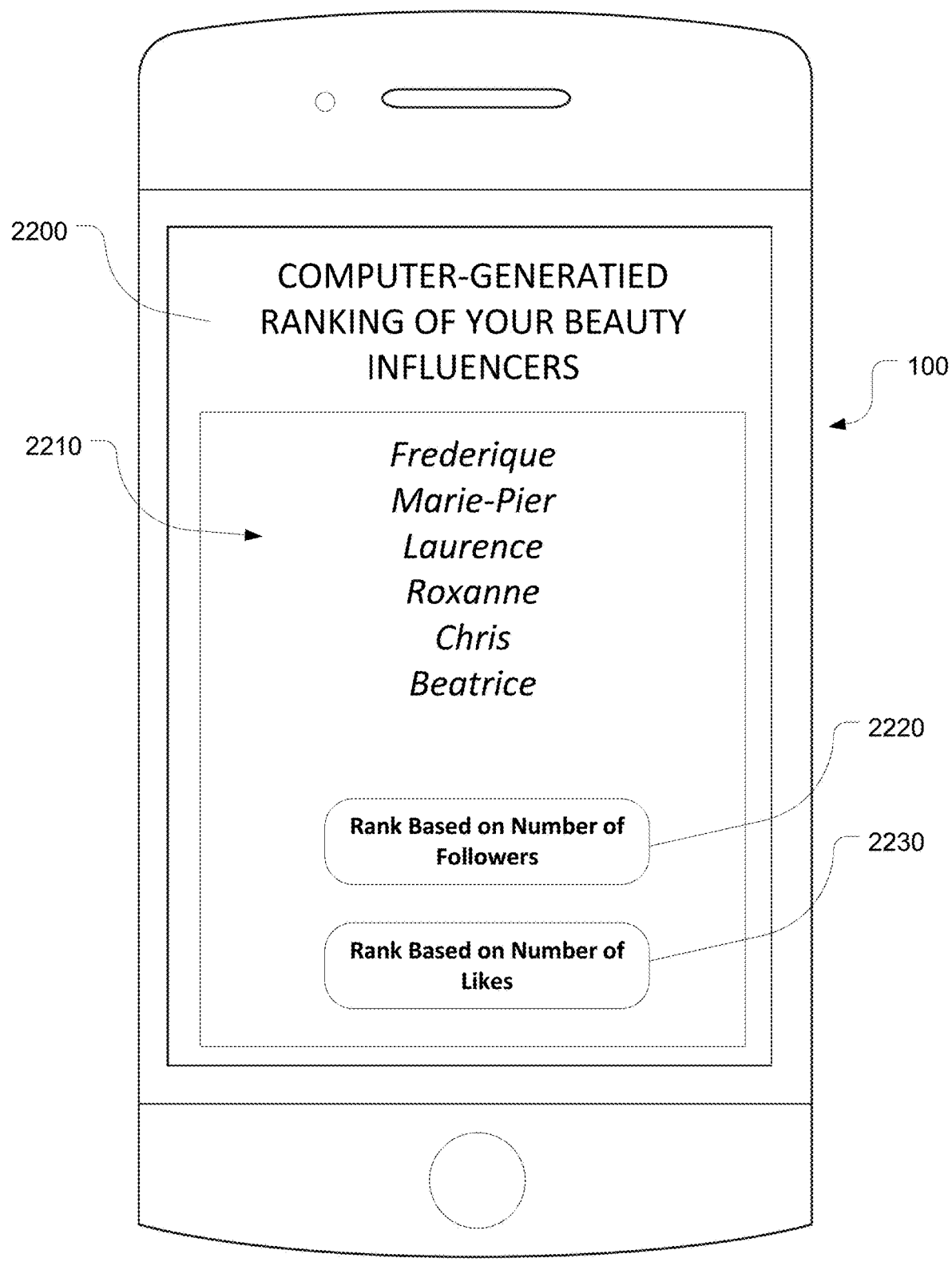
FIG. 22 depicts a mobile device displaying a graphical user interface that presents a computer-generated ranking of beauty influencers.

FIG. 22 depicts a mobile device 100 displaying a graphical user interface 2200 that presents a computer-generated ranking 2210 of beauty influencers. The graphical user interface can present a virtual button (user interface element) to change the ranking, i.e. to rank the beauty influencers based on the number of followers 2220 or to rank them based on the number of likes 2230. Another criterion may be used to rank contacts or friends. The ranking scheme may also be a hybrid of multiple criteria.

In one embodiment of the invention, the app can be adaptive to the usage patterns of the user. As the user of the app spends more and more time on it, the home page of the app and the suggestions provided by the app become more personalized as the app learns what the user prefers and how she interacts with the app.

In one implementation, the app may provide a function to pose a question to the user's friends and/or cosmetic service providers and/or to a community at large.

Figure 23:
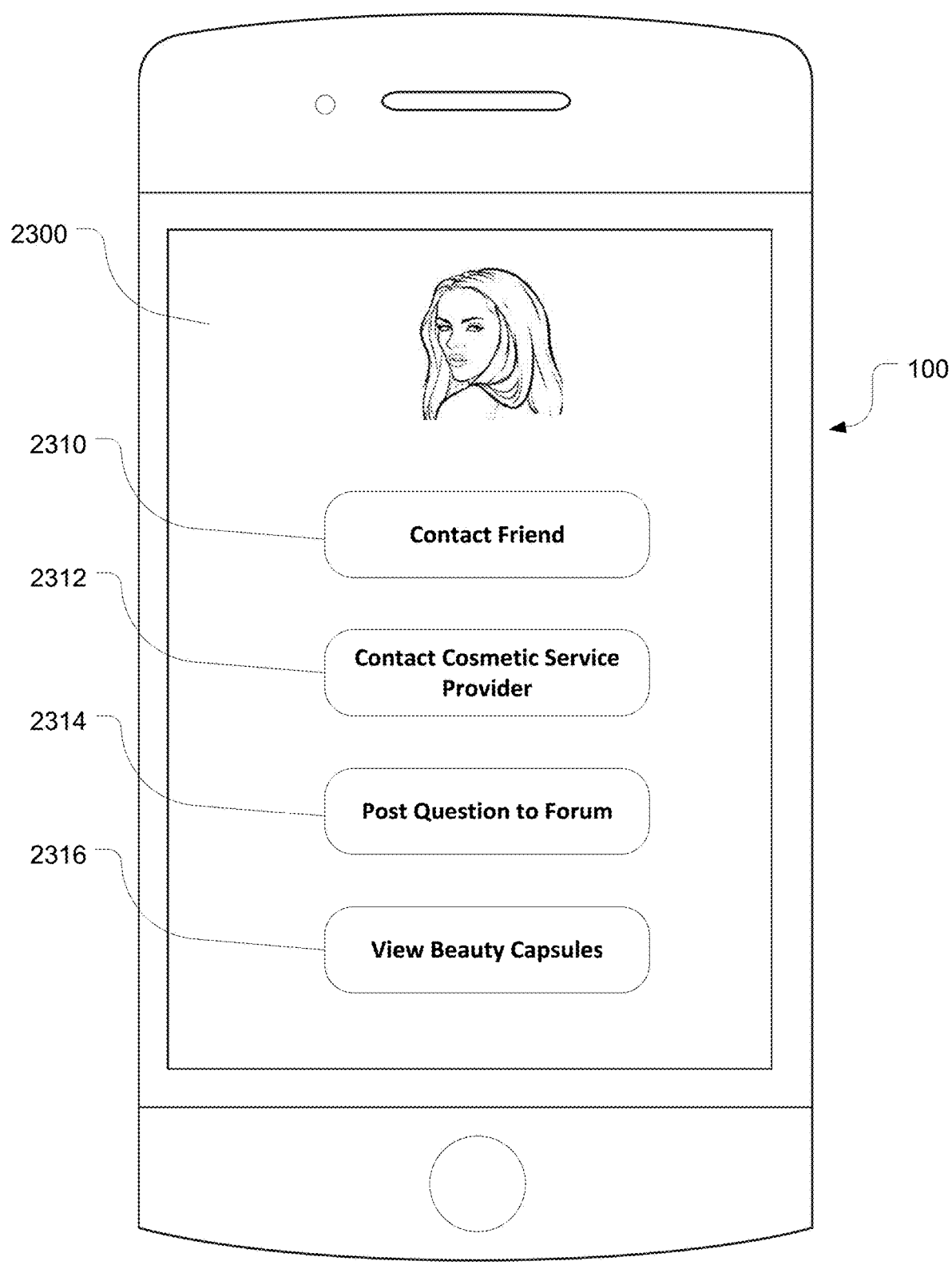
FIG. 23 depicts a mobile device displaying a graphical user interface that presents user interface elements for contacting the friend, contacting the cosmetic service provider, posting a question to a beauty-related forum, or viewing beauty capsules.

For example, FIG. 23 depicts a mobile device 100 displaying a graphical user interface 2300 that presents user interface elements 2310, 2312, 2314, 2316 for contacting the friend, contacting the cosmetic service provider, posting a question to a beauty-related forum, or viewing beauty capsules (i.e. collections of podcasts, videos, photos and other online information about a beauty topic).

In one embodiment, the app comprises computer-readable code that is programmed to enable electronic payment for the cosmetic service, either on completion of the service or as a deposit for an upcoming service. The app may provide electronic payment using any suitable electronic payment tool such as Apple Pay, Google Pay, credit card, debit card, e-transfer, Interac, bitcoin (cryptocurrency) or any other electronic payment technology.

Figure 24:
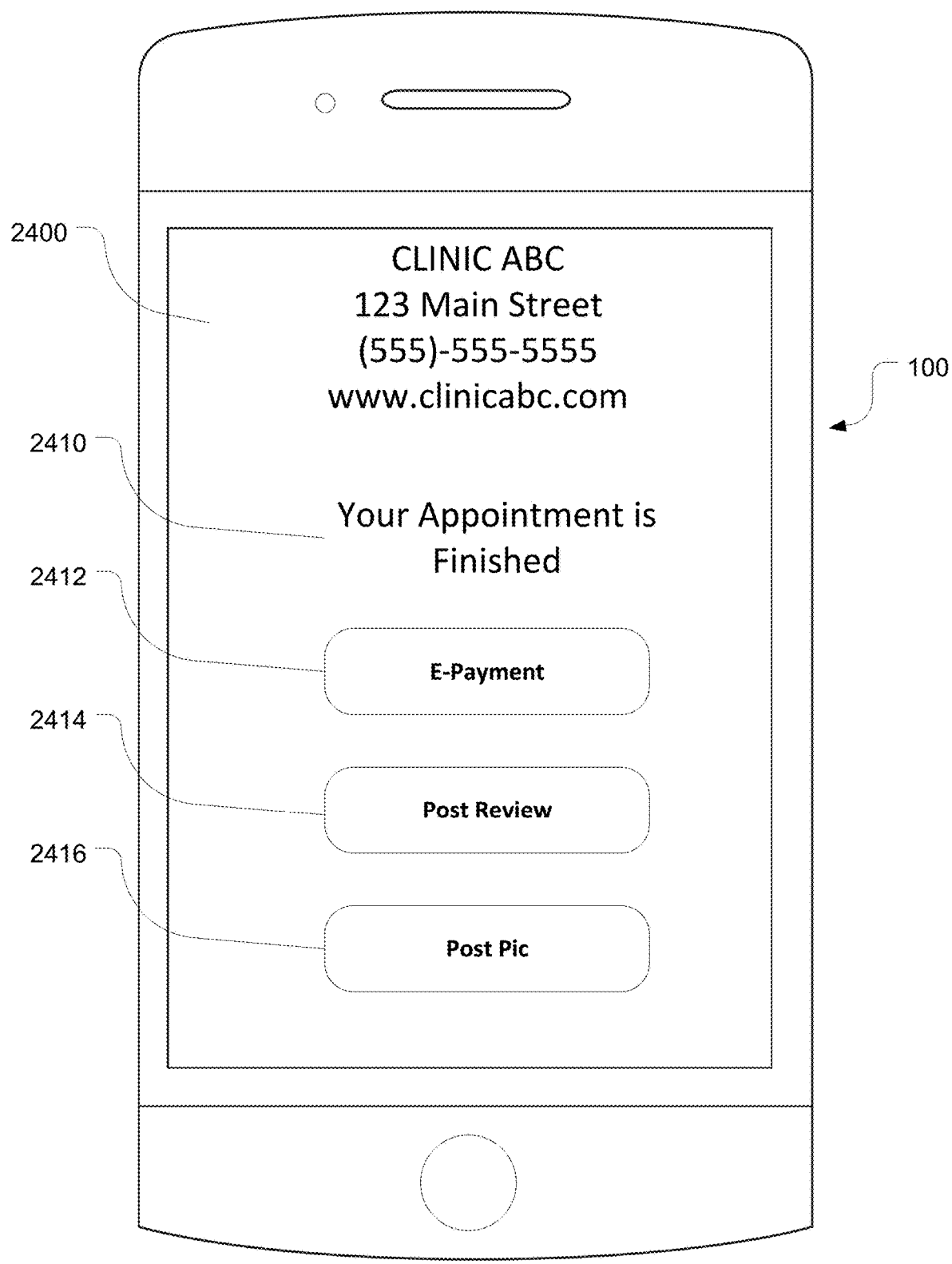
FIG. 24 depicts a mobile device displaying a graphical user interface that presents a screen to the user when the appointment is finished, prompting the user to make an e-payment, post a pic or post a review.

FIG. 24 depicts a mobile device 100 displaying a graphical user interface 2400 that presents a screen with a notification 2410 to the user when the appointment is finished, prompting the user to make an e-payment, post a pic or post a review. Virtual buttons 2412, 2414, 2416 are provided to make an e-payment, post a review or post a pic.

Figure 25:
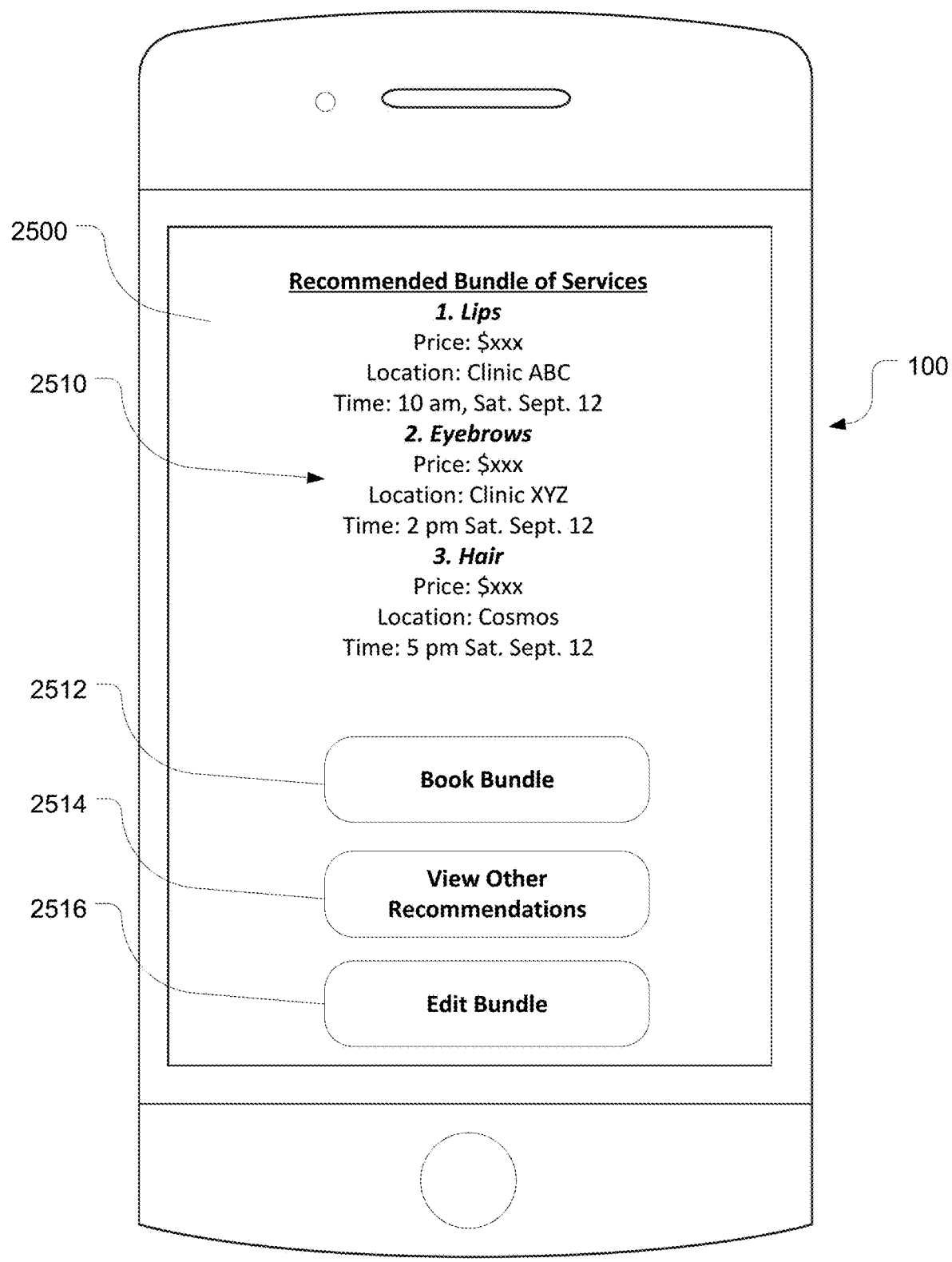
FIG. 25 depicts a mobile device displaying a graphical user interface that presents a bundle of cosmetic services.

FIG. 25 depicts a mobile device 100 displaying a graphical user interface 2500 that presents a bundle of cosmetic services 2510. In this example implementation of the technology, the mobile device identifies a bundle of cosmetic services, for example in response to the user clicking on a photograph of a contact. For example, the user viewing a friend's photographs on Instagram® or Facebook® may click on a photograph that the user finds particularly appealing and this would automatically cause the server to identify all cosmetic services that have been done in a given period of time, e.g. in the past year, subject to any privacy filters applied by the friend limiting sharing of this information with the user. In one embodiment, the app enables the user to click on any photo of a person on any public profile on a social media platform. If the person is not already a contact, friend, or follower, the app automatically sends a request to the person requesting to connect/follow/befriend the person and/or to receive cosmetic procedure information relating to the photo. Optionally, as shown by way of example in FIG. 25, the server proposes an itinerary 2510 for the user to visit the identified cosmetic service providers based on time, location and/or cost. The user may specify the criteria (e.g. cost, distance, location, hours of operation, rating, etc.) and may also optionally weight the criteria. In a variant, the user computing device enables the user to select a photograph of a contact posted on social media (e.g. Instagram or Facebook) and to obtain information about the cosmetic service associated with the photograph. The information may be web-based content, articles, photos, videos, podcasts, blogs, etc. The graphical user interface 2500 of FIG. 25 also provides user interface elements (virtual buttons) to book the bundle 2512, view other recommendations 2514 and edit the bundle 2516. Editing the bundle enables the user to create a new bundle of services from other recommended service providers. When the user touches the user interface element 2512, the app automatically sends messages/requests to the various cosmetic service providers to book the services at each of the proposed times. The app receives confirmations of the appointments, generates calendar entry data in response thereto, and then saves these calendar entries as new appointments into the calendar application on the mobile device.

In one optional implementation, the app has computer-readable code that is programmed to enable partnerships with cosmetic service providers, e.g. advertising, e-coupons, location-based advertising, bundling of services, providing discounts for referrals or for good reviews. In one specific embodiment, the app comprises computer-readable code that enables the user to send an offer to the cosmetic service provider to purchase an advertisement using the user's photo(s). The offer may include a price for the advertisement and other parameters such as a geographical region, duration, social media sites, etc. The app may be programmed to enable the cosmetic service provider to accept or reject the offer, or to make a counteroffer to the user. The app may also be programmed to enable the cosmetic service provider to send an offer to a user who has undergone a cosmetic procedure to advertise for the cosmetic service provider. The advertisement may include a hyperlink to the website of the cosmetic service provider and/or hyperlinks to photos of others who have posted photos after using the same cosmetic service provider. The advertisement may include a testimonial or review from the user and optionally a user interface element to communicate with the user. If the offer is accepted, the app enables the user to receive confirmation of acceptable and notification of payment of the price for the advertisement. The payment may be made in any suitable currency or in another form of compensation such as a credit or e-coupon for another procedure. The app comprises code that enables the cosmetic service provider to create and send the advertisement to a target social network such as Facebook or Instagram. Alternatively, the app comprises code to pay the user based on a click-through paradigm agreed upon by the user and the cosmetic service provider. In this click-through advertising paradigm, the user is paid by the cosmetic service provider every time that a person clicks on the advertisement posted by the user. The advertisement may be a tag such as @cosmeticserviceprovider that the user adds to a post in Instagram. The advertisement in Facebook may be a check-in, tag, or any link to the cosmetic service provider.

In one embodiment, the app comprises computer-readable code to broadcast location-based advertising (LBA) by, or on behalf of, the cosmetic service provider using the app. In this embodiment, the user may consent to share location updates via the app, or via other application or method, with the cosmetic service provider. The cosmetic service provider in this embodiment uses the app to transmit location-based advertisements to the user subscribing to the LBA (and also to other subscribers) whose location is within a prescribed distance of the cosmetic service provider. The LBA may provide discounts, e-coupons, offers, etc. to the user. A cosmetic service provider with idle or unbooked estheticians may solicit business from its nearby clientele by offering specials or discounts. The user may use the app to accept to book a last-minute appointment in response to the LBA.

In one embodiment, the app comprises computer-readable code to provide a reminder module to remind the user to schedule or book recurring cosmetic procedures. For example, the reminder module may learn from analysis of past bookings that the user typically books a hair appointment every month or a lashes appointment every two months. By learning usage patterns relating to cosmetic procedures, the app may then generate and output a reminder to the user to book an appointment.

In another embodiment, the app comprises computer-readable code to provide a renewal-recommendation module that detects when a previously performed cosmetic procedure has faded. The renewal-recommendation module analyzes and photos of the user in the photo album on the mobile device and to compares the photos with the photos taken immediately after the cosmetic procedure to determine if the cosmetic procedure has faded or degraded. The app applies a change threshold to assess if the cosmetic procedure has faded or degraded excessively. If so, the renewal recommendation module presents a renewal recommendation to the user. For example, the renewal recommendation may be textual reminder. Optionally, the renewal recommendation may include a quantification of the degradation, e.g. 75% degraded. Optionally, the renewal recommendation may include photos comparing the user after the procedure with the most recent photo. Optionally, the feature(s) in question may be enlarged/zoomed to emphasize the change. The app may prompt the user to book a new appointment. The app may be configured to automatically book a new appointment upon detecting a change that exceeds a predetermined threshold and to notify the user. Optionally, the app may be configured to automatically capture images of the user without user input (i.e. without the user taking a selfie) and to compare the images captured automatically with the photos of the user to make a renewal recommendation. The images captured may be stored in a separate portion of the device memory segregated from the photo album. Alternatively, the images captured made be deleted after comparison is complete.

In one embodiment, the app comprises computer-readable code to provide a facial recognition management module that monitors cosmetic procedures to determine if the visual changes to the face of the user due to the cosmetic procedure affect any computer-based facial recognition systems that the user is using for biometric identification. In one variant, the facial recognition management module is programmed to analyze before and after photos in one variant. In another variant, the facial recognition management module compares a projected or simulated image (prior to engaging in the procedure) to predict whether the cosmetic procedure will affect computer-based facial recognition.

If the app determines that the cosmetic changes do not exceed a threshold, the app may be configured to notify the user that the cosmetic procedure will not affect computer-based facial recognition. If the app exceed a threshold, the app can be configured to notify the user. Optionally, the app can cause the mobile device to reset or recalibrate any computer-based facial recognition systems. For example, if the mobile device implements a facial recognition system to biometrically unlock the mobile device without having to enter a password or fingerprint, the app may interact with the operating system or security module of the mobile device to reset or recalibrate the face print of the user so that the facial recognition system recognizes the user following the cosmetic procedure.

Similarly, the app may communicate with external devices that use facial recognition to reset or recalibrate the face print of the user. The app may thus cause the mobile device to communicate the updated face print to a smart home security system, a workplace facial recognition system, a biometric automobile security system, etc. Optionally, the app may be configured to digitally sign the updated photos of the user and to transmit the digitally signed updated photos to a third party to update a third-party facial recognition database. The third-party facial recognition database may be a government database, employer database, etc. For example, the app may be configured to automatically submit digitally signed updated photos of the user to supplement or replace photos of the user maintained for facial identification. In a variant, the app may send the digitally signed updated photos to a government agency to supplement the government agency's database, advise the government agency of the facial change or request new government-issued identification documents. For example, the app may comprise code programmed to submit an electronic request for a new driver's license or ask the a motor vehicle licensing authority to examine the changes in the before and after photos and to indicate if a new driver's license is required in view of the facial change. As another example, the app may comprise code programmed to submit a request with photos to a passport office to request that the passport office indicate whether a new passport is required. The app thus manages the facial changes resulting from the cosmetic procedure to ensure that third party databases relying on recognition of the user's face for identification or authentication of the user are not thwarted by the facial changes.

In one optional implementation, the app has computer-readable code that is programmed to assist users with emergencies (e.g. places unexpectedly closed, appointments cancelled) by finding and suggesting alternate cosmetic service providers who are able to be substituted.

Figure 26:
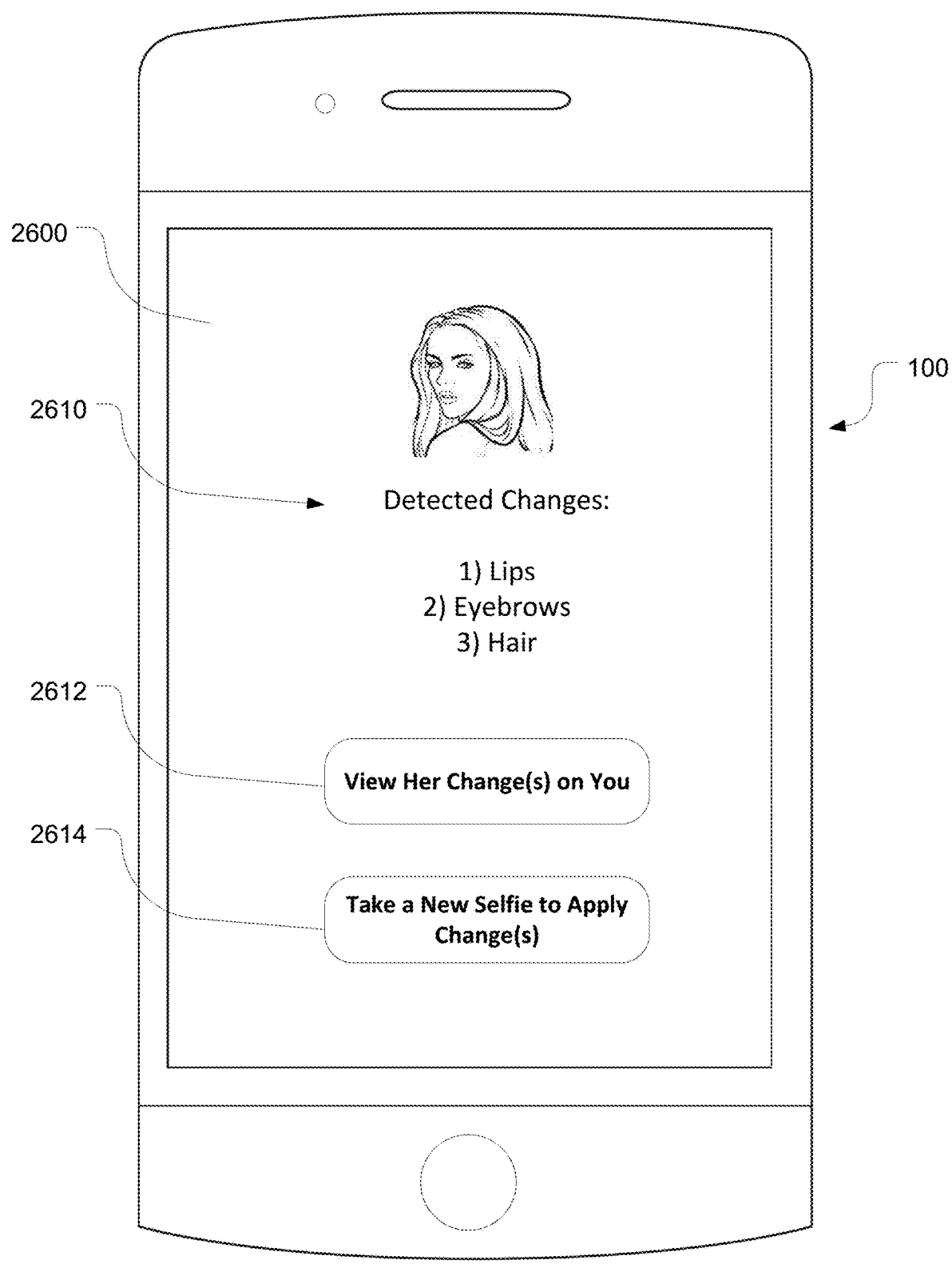
FIG. 26 depicts a mobile device displaying a graphical user interface that enables the user to preview what her friend's recent cosmetic procedures would look like on herself.

FIG. 26 depicts a mobile device 100 having a memory and processor for executing an application having computer-readable code that is programmed to display a graphical user interface 2600 that enables the user to preview what her friend's recent cosmetic procedures would look like on herself. The graphical user interface 2600 presents detected changes 2610, e.g. lips, lashes, eyebrows and hair. As shown in FIG. 26, the graphical user interface 2600 presents a virtual button 2612 to view those changes applied to the user so that the user can see what those changes will look like once applied to herself. The graphical user interface 2600 also presents a virtual button 2614 to enable the user to take a new selfie to apply the changes, which is useful if the photograph of the friend does not easily correlate to a previously taken selfie or photo stored in the photo album in the memory of the user's mobile device. The app may provide visual cues (e.g. arrows to indicate a suggested rotation of the user's head or a wire-mesh frame of a head to show the desired angle, pose or facial orientation) to guide the user to take a selfie that most resembles the friend's pic so as to facilitate comparison.

In an embodiment, the app may be programmed to suggest recommendations to the user by presenting procedures undergone by friends based on similar general appearances, similar facial features, hair color, hair style, etc. The app presents the friends' cosmetic procedures to the user as being ones that are most likely to be relevant or applicable to the user. In this embodiment, the app is programmed to compute or obtain from an external source a facial numerical signature by computing geometrical attributes of key facial landmarks or features of the friends or geometrical aspects of the friends' faces. This may include eye gap, lip width, aspect ratio of head height to height width, distance from nose to each eye, distance from nose to mouth, etc. Once the facial numerical signature of each friend is determined or obtained, the app can compare all friends' faces to the user's face to determine which friends have the most similar face to the user. The before and after photos of the face(s) most similar to the user's face can then be displayed along with an indication of which cosmetic procedures were done. The app may also be programmed to display the photos of those friends that most closely resemble the user in order of most similar to least similar.

Figure 27:
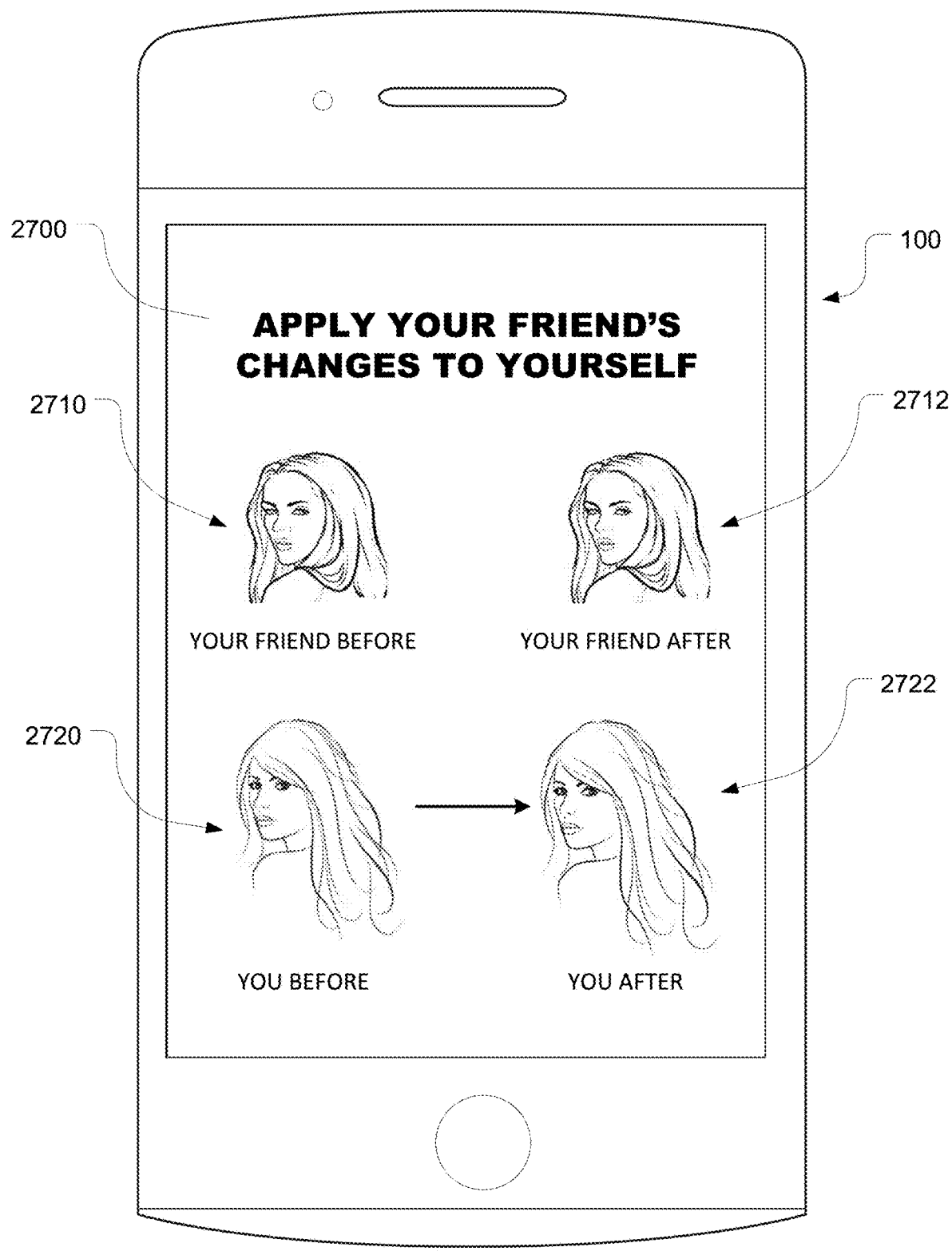
FIG. 27 depicts a mobile device displaying a graphical user interface that enables the user to preview the visual effect of cosmetic procedures undergone by the user's friend.

FIG. 27 depicts the mobile device 100 displaying a graphical user interface 2700 that enables the user to preview the visual effect of cosmetic procedures undergone by the user's friend. In this example, the friend's before pic 2710 and the friend's after pic 2712 are displayed. The user's actual pic (e.g. selfie) 2720 and the projected/computer-enhanced preview 2722 are also displayed. In one embodiment, the user computing device is configured to display photographs of a contact before a cosmetic procedure and of the contact after the cosmetic procedure and also showing a projected/computer-enhanced preview of how the user would appear after undergoing the same cosmetic procedure. In a variant, the user can select or deselect individual procedures in the case where the friend's pic reflects multiple procedures. The graphical user interface 2700 also enables the user to expand or enlarge the preview 2722 to occupy the full screen of the mobile device 100. The app providing the graphical user interface 2700 also enables the user to send the preview to a friend or to a cosmetic service provider optionally along with information about the friend who underwent the same procedure(s). The app can then receive automatically from the cosmetic service provider a cost estimate and/or booking time for the procedure. The app can display this cost and booking time on the mobile device to enable the user to accept to reject it. If the user rejects the proposed cost and time, the app may display an alternate cosmetic service provider or a different procedure and/or time at the same cosmetic service provider.

In an embodiment, the app comprises computer-readable code to enable the user to share the projected/computer-enhanced preview 2722 with one or more friends to obtain their comments or feedback on the projected effect of the cosmetic procedure. The app may also enable the user to create or define a panel of trusted beauty advisors to receive the projected/computer-enhanced preview 2722 so as to provide the user with their feedback or comments on the proposed cosmetic procedure. The panel may be composed of friends, beauty influencers, estheticians, or any other suitable group of individuals. The app may also have code to anonymize the identity of the user and post the projected/computer-enhanced preview 2722 to a third-party website or platform to receive votes on the projected look. Alternatively, the app may post the projected/computer-enhanced preview 2722 to a social media site to obtain votes, likes, comments, or feedback. The app may generate two or more alternate projected/computer-enhanced previews 2722 to enable friends, followers or others to vote on which look they prefer.

In one implementation, the app comprises computer-readable code to send the projected/computer-enhanced preview 2722 to one or a plurality of cosmetic service providers to obtain a price quote and/or an appointment and/or feedback/advice/recommendations from the cosmetic service provider.

In an embodiment, the app has a scheduling module that retrieves calendar information from a calendar application executing on the same mobile device and uses this calendar information to determine suitable appointment times. In one embodiment, the scheduling module of the app requests and receives appointment availability times from one or a plurality of cosmetic service providers and then compares all appointment availability times with the calendar information of the calendar application executing on the mobile device of the user to determine user-acceptable appointment times.

The scheduling module of the app may also use travel time as a criterion in determining the user-acceptable appointment times. The app may also use a desired order of procedures as a further criterion in determining the user-acceptable appointment times. For example, if procedure A should be done prior to procedure B, then the app automatically schedules procedure A prior to procedure B. Once the user-acceptable appointment times are determined by the app, the scheduling module of the app then transmits one or more appointment requests to the one or more cosmetic service providers for the one or more user-acceptable appointment times. The scheduling module of the app receives appointment confirmations from the cosmetic service providers and transfers these into the calendar application of the mobile device as new appointments. The scheduling module of the app may further cause the calendar to set reminders for each of the appointments based on travel time. In a variant, the scheduling module of the app of the user may coordinate with the app of a friend to schedule appointments at concurrent times so that the user and her friend can receive treatments at the same place and time. For example, the user and her friend may wish to have their hair or nails done at the same salon at the same time. In a variant, the scheduling module can schedule appointments based on time constraints imposed by e-coupons stored in a memory of the mobile device. The scheduling module on the user's mobile device can also be configured to coordinate with the scheduling modules of other friends' apps to utilize a group-type coupon, e.g. a Groupon®.

In one embodiment, the app may be programmed to include a proposal module for use by a cosmetic service provider to send a proposal to a user based on one or more photos and optionally also based on a user-specified cosmetic procedure that are provided to the cosmetic service provider by the user. In this embodiment, the proposal module receives a photo of the user and then searches a face database for the most similar face in the face database. The face database contains photos of a plurality of women. The photos may be meta-tagged by type of cosmetic procedure. The face database generally contains photos of women who unknown to the user, i.e. are not friends or contacts of the user, thus providing a much greater selection of photos from which to find one that is similar in appearance. The proposal module thus can provide before and after photos of a similarly looking woman to the user along with the same procedure applied to the user's face, i.e. showing before and after photos. In this embodiment, the proposal module requests consent of the user prior to uploading or sharing the user's photos. The app may also provide compensation (e.g. e-coupon, subscription to the database) to the user who consents to share her before and after photos with others using the database. In a variant, the app may enable limited sharing based on location/geography, time, type of procedure, etc.

In one embodiment, the app comprises computer-readable code to provide an aging module to enable the user to visualize the effect of aging on a particular cosmetic treatment that the user wishes to undergo or which the user has already undergone. In one embodiment, the aging module generates computer-generated images to show a simulated aging effect on the user following the cosmetic procedure. In this embodiment, the aging module applies an aging model to predict how a cosmetic procedure will appear in a certain amount of time into the future. In another embodiment, the aging module may use actual photos of a person to show how that person's facial feature or body feature aged in the time following the cosmetic procedure. The app or server, as the case may be, may be configured to collect photos of a person over time to show the effect of time on a given procedure. For example, the user may view before and after photos of a procedure to see what the immediate visual effect of the change would look like. The app may be configured to obtain further photos of the same person showing the same facial or body feature at future times to enable visualization of how the user will look in the future. The foregoing may be combined or augmented with cosmetic surgery visualization, simulation, evaluation and prediction technologies such as those disclosed in U.S. Pat. Nos. 7,783,099, 7,424,139, 8,033,832, 9,760,935, 10,176,275, 7,079,158, 10,324,739, 8,391,639, 8,908,904, 7,336,810, and 8,027,505, all of which are incorporated herein by reference to the maximum extent not incompatible with the present disclosure. Furthermore, the technologies disclosed in U.S. Patent Application Publications 2017/0119471, 2017/0111632, 2016/0005106, 2003/0065255, 2005/0063582, 2007/0058858, and 2013/0129210, all of which are incorporated by reference to the maximum extent not incompatible with the present disclosure, may be utilized in combination with one or more of the embodiments of the invention described herein.

From the above description it is apparent that the app provides various computer-implemented methods for finding, evaluating and interacting with cosmetic service providers.

These methods can be implemented in hardware, software, firmware or as any suitable combination thereof. That is, if implemented as software, the computer-readable medium comprises instructions in code which when loaded into memory and executed on a processor of a server or a user computing device such as a tablet or mobile device causes the user computing device to perform any of the foregoing method steps. These method steps may be implemented as software, i.e. as coded instructions stored on a computer readable medium which performs the foregoing steps when the computer readable medium is loaded into memory and executed by the microprocessor of the mobile device. A computer readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

For the purposes of interpreting this specification, when referring to elements of various embodiments of the present invention, the articles "a", "an", "the" and "said" are intended to mean that there are one or more of the elements. The terms "comprising", "including", "having", "entailing" and "involving", and verb tense variants thereof, are intended to be inclusive and open-ended by which it is meant that there may be additional elements other than the listed elements.

This invention has been described in terms of specific implementations and configurations which are intended to be exemplary only. Persons of ordinary skill in the art will appreciate that many obvious variations, refinements and modifications may be made without departing from the inventive concepts presented in this application. The scope of the exclusive right sought by the Applicant(s) is therefore intended to be limited solely by the appended claims.

The invention claimed is:

1. A computer system for finding, evaluating and interacting with cosmetic service providers, the computer system comprising:
a user computing device comprising:
a user interface for receiving user input specifying a search query for a cosmetic service; and
a location-determining subsystem for determining a current location of the user computing device;
a server connected via a data network to the user computing device, the server having a processor configured to search for all cosmetic service providers offering the cosmetic service within a prescribed geographical area based on the search query and the current location received from the user computing device, the processor being further configured to filter the cosmetic service providers based on reviews and visits from social media contacts of the user, wherein the visits of each contact are determined by an artificial intelligence module that automatically compares photographs posted by the contact on social media to infer that the contact has used one of the cosmetic service providers and by correlating the times of the posted photographs with a location history of the contact by obtaining timestamp and location metadata of the posted photographs, and wherein the processor is further configured to cause the server to transmit filtered cosmetic service providers to the user computing device;
wherein the user computing device is further configured to display the filtered cosmetic service providers and to present a user interface element to enable the user to communicate with one of the cosmetic service providers or with the contact who has used one of the cosmetic service providers.

2. The computer system of claim 1 wherein the user computing device is configured to display photographs of the contact before a cosmetic procedure and of the contact after the cosmetic procedure and also showing a projected/computer-enhanced preview of how the user would appear after undergoing the same cosmetic procedure, wherein the projected/computer-enhanced preview is generated by using an image representative of a facial change due to the cosmetic procedure, the image representative of the facial change being obtained by graphically subtracting a before-procedure photograph from an after-procedure photograph.

3. The computer system of claim 1 wherein the user computing device displays a privacy settings page to enable the user to define a subset of contacts on social media with whom cosmetic-related information is shared, wherein the privacy settings page also enables the user to specify what type of cosmetic procedure information is shared with which contacts.

4. The computer system of claim 1 wherein the user computing device further filters the cosmetic service providers based on a ranking of the contacts, wherein the ranking is based on a user-assigned ranking of contacts, a computer-generated ranking based on a number of followers of the contact or a computer-generated ranking based on a number of likes received by the contact.

5. The computer system of claim 1 wherein the server is configured to, when comparing the photographs, identify and ignore any of the photographs to which filters or lenses have been applied.

6. The computer system of claim 1 wherein the user interface element on the user computing device enables the user to chat with the cosmetic service provider and to receive links via the chat to social media posts of contacts and/or public profiles containing content relating to the cosmetic service.

7. The computer system of claim 1 wherein the user computing device enables the user to select one of the posted photographs of the contact that the contact has posted on social media, thereby defining a selected photograph, and to obtain information about the cosmetic service associated with the selected photograph in response to touching the selected photograph, wherein the information about the cosmetic service is displayed on the selected photograph.

8. A non-transitory computer-readable medium comprising computer-readable instructions in software code which when stored in a memory and executed by a processor of a user computing device cause the user computing device to:
receive user input specifying a search query for a cosmetic service; and
determine a current location of the user computing device;
search for all cosmetic service providers within a prescribed geographical area based on the search query and the current location;
filter the cosmetic service providers based on reviews and visits from contacts of the user, wherein the visits of each contact are determined by an artificial intelligence module that automatically compares photographs posted by the contact on social media to infer that the contact has used one of the cosmetic service providers and by correlating the times of the posted photographs with a location history of the contact by obtaining timestamp and location metadata of the posted photographs;
display the filtered cosmetic service providers; and
present a user interface element to enable the user to communicate with one of the cosmetic service providers or with the contact who has used one of the cosmetic service providers.

9. The non-transitory computer-readable medium of claim 8 comprising code to cause the user computing device to display photographs of the contact before a cosmetic procedure and of the contact after the cosmetic procedure and also showing a projected/computer-enhanced preview of how the user would appear after undergoing the same cosmetic procedure, wherein the projected/computer-enhanced preview is generated by using an image representative of a facial change due to the cosmetic procedure, the image representative of the facial change being obtained by graphically subtracting a before-procedure photograph from an after-procedure photograph.

10. The non-transitory computer-readable medium of claim 8 wherein the code causes the user computing device to display a privacy settings page to enable the user to define a subset of contacts on social media with whom cosmetic-related information is shared, wherein the privacy settings page also enables the user to specify what type of cosmetic procedure information is shared with which contacts.

11. The non-transitory computer-readable medium of claim 8 wherein the code further filters the cosmetic service providers based on a ranking of the contacts, wherein the ranking is based on a user-assigned ranking of contacts, a computer-generated ranking based on a number of followers of the contact or a computer-generated ranking based on a number of likes received by the contact.

12. The non-transitory computer-readable medium of claim 8 wherein the code causes the user computing device to display a user interface element to automatically book an appointment, add the appointment to a calendar and to prompt the user to post a photograph and/or a review when the user computing device detects that the calendar appointment has ended.

13. The non-transitory computer-readable medium of claim 8 wherein the code identifies a bundle of cosmetic services in response to the user clicking on a photograph of a contact and then proposes an itinerary based on time, location and cost.

14. The non-transitory computer-readable medium of claim 8 wherein the code automatically tags a photograph of the user with a keyword identifying the cosmetic service when the photograph is taken within a predetermined time of a calendar appointment at the cosmetic service provider and/or when the photograph is taken within a predetermined distance of the cosmetic service provider.

15. The non-transitory computer-readable medium of claim 8 wherein the code causes the user computing device to enable the user to select one of the posted photographs of the contact that the contact has posted on social media, thereby defining a selected photograph, and to obtain information about the cosmetic service associated with the selected photograph in response to touching the selected photograph, wherein the information about the cosmetic service is displayed on the selected photograph.

16. The non-transitory computer-readable medium of claim 8 wherein the code causes the user computing device to compare two posted photographs of before-procedure and after-procedure faces of the contact by (i) initially verifying that the posted photographs are of the same contact; (ii) verifying if the faces in the posted photographs are the same size and, if not, scaling one or both of the posted photographs to make the faces of the two photographs the same size; (iii) determining if the faces of each of the two photographs are aligned such that the faces have a same orientation; (iv) if the faces are misaligned, generating a computer-generated image of a rotated reconstructed image of one or both of the faces; (v) overlaying the images of the faces by aligning facial landmarks such as eyes, nose and mouth; and (vi) subtracting the posted photograph of the before-procedure face from the posted photograph of the after-procedure face to generate an image representing the facial change due to the cosmetic procedure.

17. The non-transitory computer-readable medium of claim 8 wherein the code causes the user computing device to generate, using a plurality of images of the user, a computer-generated three-dimensional model of a head and/or body of the user, wherein the computer-generated three-dimensional model is rotated and/or scaled to enable a scale and orientation of the posted photograph of the contact to be matched to a two-dimensional image extracted from the computer-generated three-dimensional model.

18. The non-transitory computer-readable medium of claim 8 wherein the code causes the user computing device to present visual cues to the user to show the user a desired angle, pose or facial orientation to guide the user to take a selfie that most resembles the posted photograph of the contact so as to facilitate comparison.

19. The non-transitory computer-readable medium of claim 18 wherein the visual cues comprise arrows to indicate a suggested rotation of a head of the user or a wire-mesh frame of the head of user.

20. The non-transitory computer-readable medium of claim 8 wherein the code causes the user computing device to automatically tag a photograph of the user with a keyword identifying the cosmetic service when the photograph is taken within a predetermined time of a calendar appointment at the cosmetic service provider, wherein the calendar appointment is defined by calendar data in a calendar application executing on the user computing device.

\* \* \* \* \*